United States Patent [19]
Amano

[11] Patent Number: 6,028,778
[45] Date of Patent: Feb. 22, 2000

[54] POWER SUPPLY DEVICE WITH IMPROVED EFFICIENCY AND REDUCED HIGHER HARMONICS

[75] Inventor: Takashi Amano, Tagata-gun, Japan

[73] Assignee: Kabushiki Kaisha TEC, Japan

[21] Appl. No.: 09/053,633

[22] Filed: Apr. 2, 1998

[30] Foreign Application Priority Data

Apr. 4, 1997 [JP] Japan ..................................... 9-087031

[51] Int. Cl.[7] ..................................... H02M 1/12
[52] U.S. Cl. ................................. 363/40; 363/37
[58] Field of Search ................... 363/20, 21, 34, 363/37, 39, 40, 131, 132

[56] References Cited

U.S. PATENT DOCUMENTS

| | | | |
|---|---|---|---|
| 4,513,226 | 4/1985 | Josephson | 315/219 |
| 5,274,540 | 12/1993 | Maehara | 363/37 |
| 5,875,107 | 2/1999 | Nagai et al. | 363/131 |

*Primary Examiner*—Adolf Deneke Berhane
*Attorney, Agent, or Firm*—Morrison Law Firm

[57] ABSTRACT

In a power supply circuit, a rectification circuit is coupled to a partial smoothing circuit, and an inverting circuit. The rectification circuit includes a rectifier coupled to a primary capacitor. The partial smoothing circuit includes a first, second, and third diode coupled together with the third diode in reverse polarity with the first and second diodes. The partial smoothing circuit also includes a series combination of a choke coil and a smoothing capacitor disposed in parallel with the second diode. A diode extends from the partial smoothing circuit to the inverting circuit. In one embodiment, the inverting circuit includes a main capacitor in parallel with a combination of a winding and an auxiliary capacitor. A switching means is coupled to the inverting circuit and the rectification circuit.

23 Claims, 32 Drawing Sheets

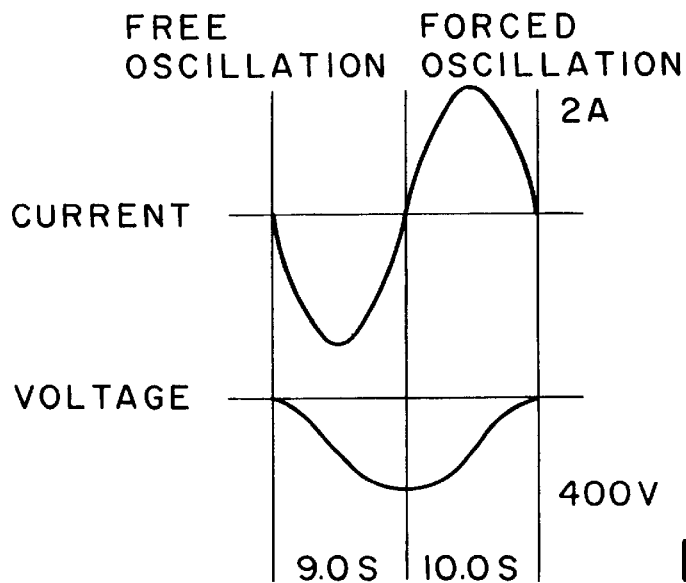
F I G. 34
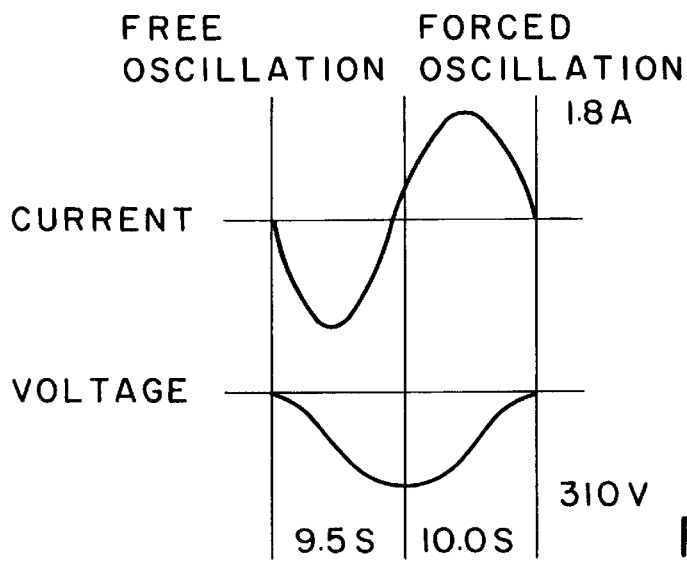
F I G. 35
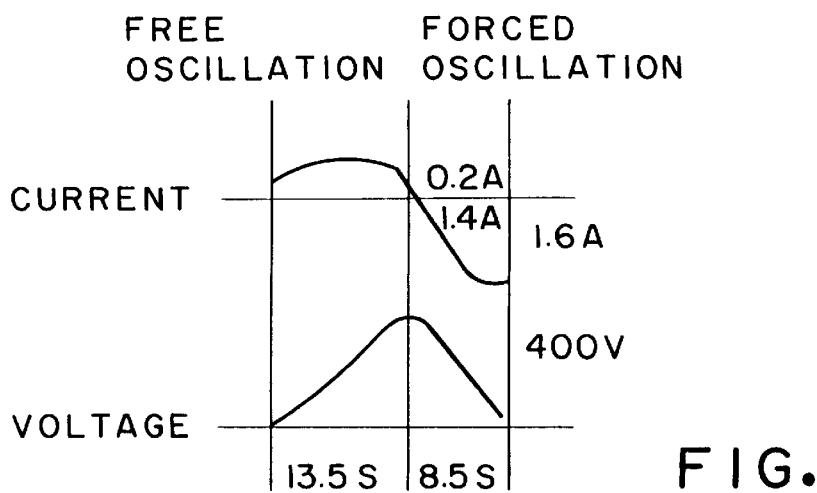
F I G. 36

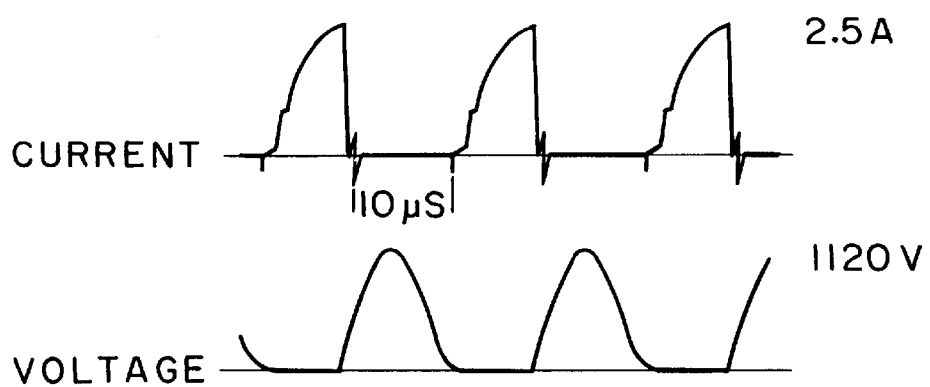
F I G. 72
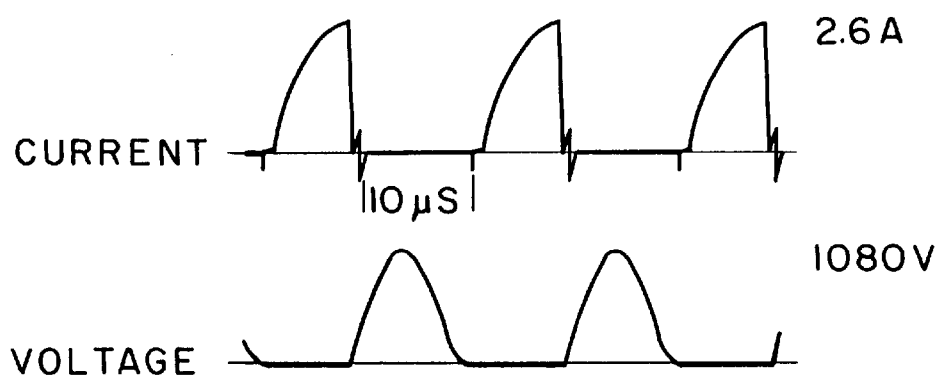
F I G. 73
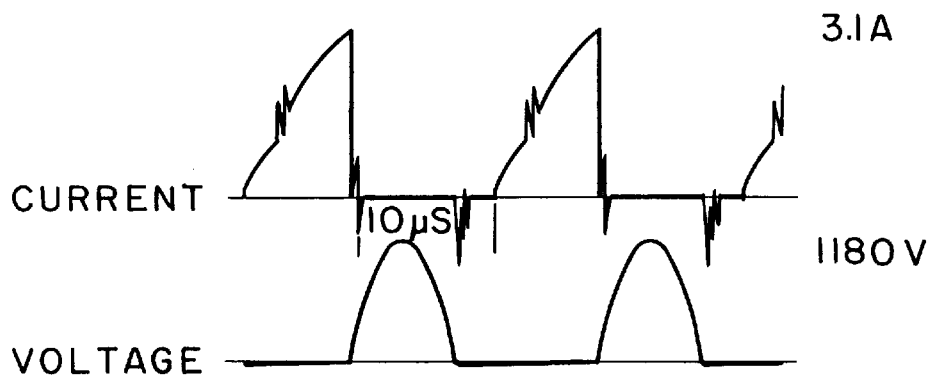
F I G. 74

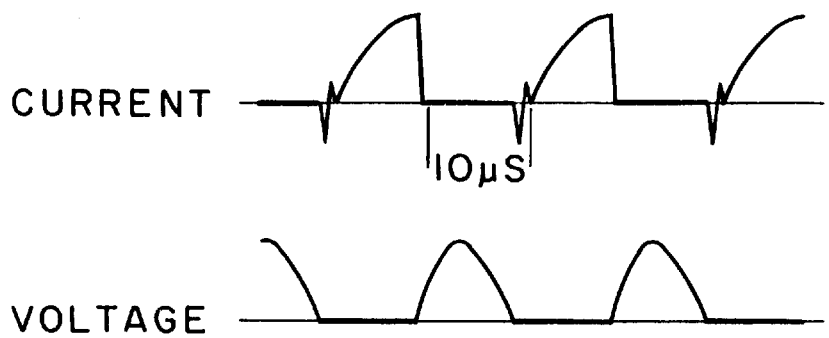
F I G. 75
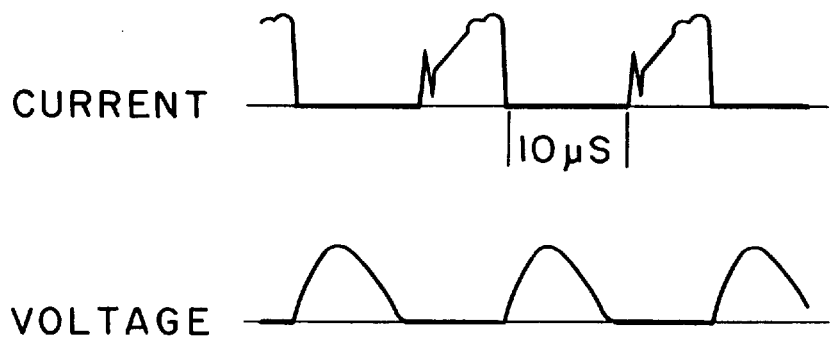
F I G. 76
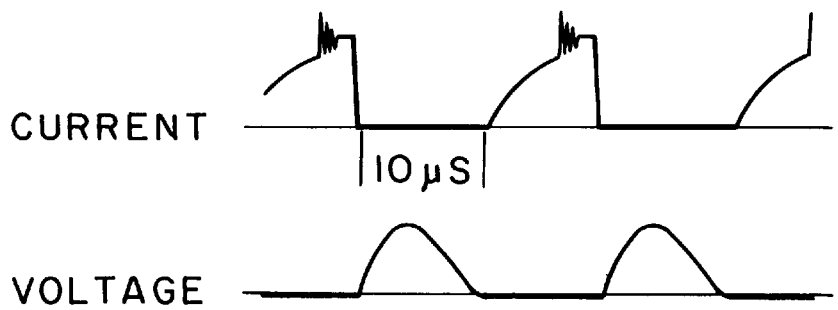
F I G. 77

POWER SUPPLY DEVICE WITH IMPROVED EFFICIENCY AND REDUCED HIGHER HARMONICS

BACKGROUND OF THE INVENTION

The present invention relates to a power supply device which includes a monolithic inverter with reduced high harmonics.

An example of conventional power supply devices of this type is disclosed in Japanese Laid-open No 149845/1996.

A power supply device disclosed in the aforementioned Japanese Patent Laid-open No. 149845/1996 includes a full-wave rectifying circuit connected to a commercial AC power supply, and a half bridge type inverter circuit which has a pair of switching elements and is connected to said full-wave rectifying circuit. A series circuit consisting of an inductor and a condenser is connected in parallel with one of the switching elements of the half-bridge type inverter circuit, while a diode and a lamp are connected in parallel with the other switching element. Another condenser is connected in parallel with the series circuit that consists of the inductor, the condenser and the diode mentioned above.

With this configuration, the fluctuation range of electric current is reduced by storing high frequency energy on the latter condenser when the output voltage from the full-wave rectifying circuit is high and supplying energy to the inverter circuit when the output voltage is low. In addition, the inverter circuit is constantly supplied with electric power from the full-wave rectifying circuit regardless of the level of output voltage from the full-wave rectifying circuit. As current is thus fed from the commercial AC power supply without interruption, distortion of input current is reduced. Thus, the above configuration is capable of reducing high harmonics and current distortion.

The circuit described above in Japanese Laid-Open Patent No. 149845/1996 can readily be used in a half-bridge type inverter circuit, since one of the two switching elements is always in the 'ON' state. However, in applications where only a single switching element is present, there is a period during which the switch does not conduct, or is in the 'OFF' state. During this 'OFF' state, a controlled resonance circuit functions independently of the switch, resulting in a free oscillation state. This free oscillation state limits the scope of power inverter type applications available for the circuit disclosed in Japanese Laid-Open Patent No. 149845/1996.

OBJECTS AND SUMMARY OF THE INVENTION

In order to overcome the above problem, an object of the present invention is to provide a power supply device which includes a monolithic inverter with reduced high harmonics.

The present invention relates to a power supply device including a non-smoothed power supply having a first condenser for a non-smoothing function; a partial smoothing circuit adapted to partially smooth the voltage of the non-smoothed power supply; and an inverter circuit having a parallel resonance circuit and a switching element connected in series with the parallel resonance circuit.

The parallel resonance circuit includes a main capacitor connected in parallel with a series circuit consisting of an inductor and a first auxiliary capacitor. A diode is connected in parallel with the first auxiliary capacitor so that it conducts current in a direction towards the inductor. The non-smoothed power supply is connected to the junction of the main and first auxiliary capacitors. The partial smoothing circuit is connected to the junction of the inductor and first auxiliary capacitor. A switching means is disposed between the parallel resonance circuit and a junction between the non-smoothed power supply and the partial smoothing circuit.

With the configuration as above, the first auxiliary capacitor and the diode reduce high harmonic elements. During the forced oscillation when the switching means is in the "on" state, from the standpoint of the non-smoothed power supply and the partial-smoothing circuit, the first auxiliary capacitor is constantly kept in parallel with the inductor and the components connected in series thereto. Through these components, forced oscillation current flows in the parallel resonance circuit, so that forced oscillation current flows continuously and stably regardless of phase-advancing impedance of the first auxiliary capacitor. During the free oscillation when the switching means is in the "off" state, the first auxiliary capacitor and the diode are in the parallel resonance circuit and contribute energy to the parallel resonance circuit regardless of the switching element. In this way, the power efficiency is increased thereby compensation for the unbalanced state of the current and increasing the circuit efficiency because the parallel resonance circuit operates is provided independently of the switching element.

According to another feature of the invention, the invention includes a series circuit which consists of a diode and a second condenser and is connected in parallel with the first condenser. With the configuration as above, during the partial smoothing action, the parallel circuit comprised of the first auxiliary capacitor and the diode associated therewith function together with the second condenser and said diode associated with the second condenser, thereby reducing high harmonic elements in the input current.

According to yet another feature of the invention, the invention includes a second auxiliary capacitor connected in parallel with the inductor.

Therefore, parallel resonance is also generated by said second auxiliary capacitor connected in parallel with the inductor.

According to yet another feature thereof, the invention relates to a power supply device including a non-smoothed power supply having a first condenser serving a non-smoothing function, a partial smoothing circuit adapted to partially smooth the voltage of the non-smoothed power supply, and an inverter circuit having a parallel resonance circuit and a switching element connected to the parallel resonance circuit, wherein the parallel resonance circuit includes a main capacitor connected in parallel with the switching element, a series circuit which is connected in series with the main capacitor in the antiphase relationship therewith and consists of an inductor and a first auxiliary capacitor connected in series, and a diode connected in parallel with said first auxiliary capacitor. The diode is in normal polarity from the standpoint of the non-smoothed power supply and in reversed polarity from the standpoint of the partial smoothing circuit; the non-smoothed power supply is connected to the first auxiliary capacitor; the partial smoothing circuit is connected to the connecting point where the inductor and the first auxiliary capacitor are connected; and wherein the first condenser, the main capacitor and the first auxiliary capacitor are connected in series.

With this configuration, the first auxiliary capacitor and the diode reduce high harmonic elements. During the forced oscillation when the switching means is in the "on" state, from the standpoint of the non-smoothed power supply and the partial-smoothing circuit, the first auxiliary capacitor is constantly kept in parallel with the inductor and the components connected in series thereto. Through these components, forced oscillation current flows in the parallel resonance circuit, so that forced oscillation current flows continuously and stably regardless of phase-advancing impedance of the first auxiliary capacitor. During the free oscillation when the switching means is in the "off" state, the first auxiliary capacitor and the diode are in the parallel resonance circuit and strengthen the parallel resonance circuit regardless of the switching element. This increases the power efficiency, rectifies the unbalanced state of the current and increases the circuit efficiency, because the parallel resonance circuit is provided independently of the switching element.

According to yet another feature thereof, the invention relates to a power supply device including a non-smoothed power supply having a first condenser serving a non-smoothing function, a partial smoothing circuit adapted to partially smooth the voltage of the non-smoothed power supply, and an inverter circuit having a parallel resonance circuit and a switching element connected to the parallel resonance circuit, wherein the parallel resonance circuit includes an inductor, a main capacitor connected in parallel with the switching element, and a diode in normal polarity from the standpoint of the non-smoothed power supply and in reversed polarity from the standpoint of the partial smoothing circuit; the non-smoothed power supply is connected to the first auxiliary capacitor and the diode, said first auxiliary capacitor is connected in series with the inductor and parallel with the series circuit comprised of the diode and the first condenser; and wherein the partial smoothing circuit is connected to the connecting point where the inductor and the first auxiliary capacitor are connected.

With the configuration as above, the first auxiliary capacitor and the diode reduce high harmonic elements. During the forced oscillation when the switching means is in the "on" state, from the standpoint of the non-smoothed power supply and the partial-smoothing circuit, the first auxiliary capacitor is constantly kept in parallel with the inductor and the components connected in series thereto. Through these components, forced oscillation current flows in the parallel resonance circuit, so that forced oscillation current flows continuously and stably regardless of phase-advancing impedance of the first auxiliary capacitor. During the free oscillation when the switching means is in the "off" state, the first auxiliary capacitor and the diode are in the parallel resonance circuit and strengthen the parallel resonance circuit regardless of the switching element. This increases the power efficiency and compensation for the unbalanced state of the current and increasing the circuit efficiency, because the parallel resonance circuit is operates independently of the switching element.

Briefly stated, in a power supply circuit, a rectification circuit is coupled to a partial smoothing circuit, and an inverting circuit. The rectification circuit includes a rectifier with a peak detector. The partial smoothing circuit includes a first, second, and third diode coupled together with the third diode in reverse polarity with the first and second diodes. The partial smoothing circuit also includes a series combination of a choke coil and a smoothing capacitor disposed in parallel with the second diode. A diode extends from the partial smoothing circuit to the inverting circuit. In one embodiment, the inverting circuit includes a main capacitor in parallel with a combination of a winding and an auxiliary capacitor. A switching means is coupled to the inverting circuit and the rectification circuit.

According to one embodiment of the invention, a power supply circuit includes rectification means; inverting means coupled to said rectification means with partial smoothing means disposed therebetween; and switching means coupled to said inverting means.

According to another embodiment of the present invention, there is provided a power supply device including a rectifier with a peak detector. A first combination of a first, second, and third diode coupled together with said third diode in reverse polarity with said first and second diode is coupled to the rectifier. A second combination of a choke coil and a smoothing capacitor is connected in parallel with the second diode. A first auxiliary capacitor is disposed in parallel with said first diode. The second diode, said second combination, and said first diode meet at a first node. A charge diode is coupled to said first node and a second node. The third diode, said second diode, said second combination, and said first auxiliary capacitor meet at a third node. A first winding is disposed between said second node and said third node. A switch is coupled between said rectifier and said second node. A main capacitor is placed in parallel with a third combination of said first auxiliary capacitor and said first winding.

According to yet another embodiment of the invention, a power supply device comprises a rectifier with a peak detector. A first combination of a first, second, and third diode are coupled together with said third diode in reverse polarity with said first and second diode. The first combination is coupled to said rectifier. A second combination of a choke coil and a smoothing capacitor is connected in parallel with said second diode. A first auxiliary capacitor is connected in parallel with said first diode. The second diode, said second combination, and said first diode meet at a first node. A charge diode is coupled to said first node and a second node. The third diode, said second diode, said second combination, and said first auxiliary capacitor meet at a third node. A first winding is disposed between said second node and said third node. A switch is coupled between said rectifier and said second node. A main capacitor is coupled in parallel with said switch. A second auxiliary capacitor is disposed in parallel with said first winding.

According to yet another embodiment of the invention, a power supply device comprises a rectifier with a peak detector. A first combination of a first, second, and third diode are coupled together with said third diode in reverse polarity with said first and second diode. The first combination is coupled to said rectifier. A second combination of a choke coil and a smoothing capacitor is connected in parallel with said second diode. The second diode, said second combination, and said first diode meet at a first node. A charge diode is coupled to said first node and a second node. The third diode, said second diode, and said second combination all meeting at a third node. A first auxiliary capacitor is coupled between said third node and said rectifier. A first winding is disposed between said second node and said third node. A switch is coupled between said rectifier and said second node. A main capacitor is coupled in parallel with said switch. A second auxiliary capacitor is in parallel with said first winding.

According to another embodiment of the present invention, a power supply device comprises a rectifier with a peak detector. A first diode is coupled to said rectifier. A first combination of a second and third diode are coupled together. The first combination is coupled to said first diode. A first capacitor is in parallel with said first combination. A second combination of a choke coil and a smoothing capacitor is in parallel with said second diode. The second diode, said second combination, and said third diode meet at a first node. A charge diode is coupled to said first node and a second node. The first and second diode, said second combination, and said first capacitor meet at a third node. A first winding is disposed between said second node and said third node. A main capacitor is disposed in parallel with said first winding. A switch is coupled between said rectifier and said second node.

According to still another embodiment of the present invention, a power supply device comprises a rectifier with a peak detector. A first diode is coupled to said rectifier. A first combination of a second and third diode are coupled together. The first combination is coupled to said first diode. A first capacitor is in parallel with said first diode. A second combination of a choke coil and a smoothing capacitor is in parallel with said second diode. The second diode, said second combination, and said third diode meet at a first node. A charge diode is coupled to said first node and a second node. The first and second diode, said second combination, and said first capacitor meet at a third node. A first winding is disposed between said second node and said third node. A main capacitor is disposed in parallel with said first winding. A switch is coupled between said rectifier and said second node.

According to yet another embodiment of the present invention, a power supply device comprises a rectifier with a peak detector. A first combination of a first, second, and third diode are coupled together with said third diode in reverse polarity with said first and second diode. The first combination is coupled to said rectifier. A second combination of a choke coil and a smoothing capacitor is in parallel with said second diode. A first auxiliary capacitor is in parallel with said second diode. The second diode, said second combination, and said third diode meet at a first node. A charge diode is coupled to said first node and a second node. The third diode, said second diode, said second combination, and said first auxiliary capacitor meet at a third node. A main capacitor is disposed between said second node and said third node. A switch is coupled between said rectifier and said second node. A winding is in parallel with a third combination of said first auxiliary capacitor and said main capacitor.

According to yet still another embodiment of the present invention, a power supply device comprises a rectifier with a peak detector. A first combination of a first, second, and third diode are coupled together with said third diode in reverse polarity with said first and second diode. The first combination is coupled to said rectifier. A second combination of a choke coil and a smoothing capacitor is in parallel with said second diode. A first auxiliary capacitor is in parallel with said first diode. The second diode, said smoothing capacitor, and said first diode meet at a first node. A charge diode is coupled to said first node and a second node. The third diode, said first auxiliary capacitor, and said rectifier meet at a third node. A main capacitor is disposed between said second node and said third node. A switch is coupled between said rectifier and said second node. A winding is in parallel with said main capacitor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 34 is a waveform illustration for explaining the troughs shown in FIG. 25;

FIG. 35 is a waveform illustration for explaining the troughs shown in FIG. 26;

FIG. 36 is a waveform illustration for explaining the troughs shown in FIG. 27:

FIG. 72 is a waveform illustration showing the crests shown in FIG. 69;

FIG. 73 is a waveform illustration showing the crests shown in FIG. 70;

FIG. 74 is a waveform illustration showing the crests shown in FIG. 71;

FIG. 75 is a waveform illustration showing the troughs shown in FIG. 69;

FIG. 76 is a waveform illustration showing the troughs shown in FIG. 70;

FIG. 77 is a waveform illustration showing the troughs shown in FIG. 71;

DETAILED DESCRIPTION OF THE PREFERRED EMBODIMENTS

Figure 1:
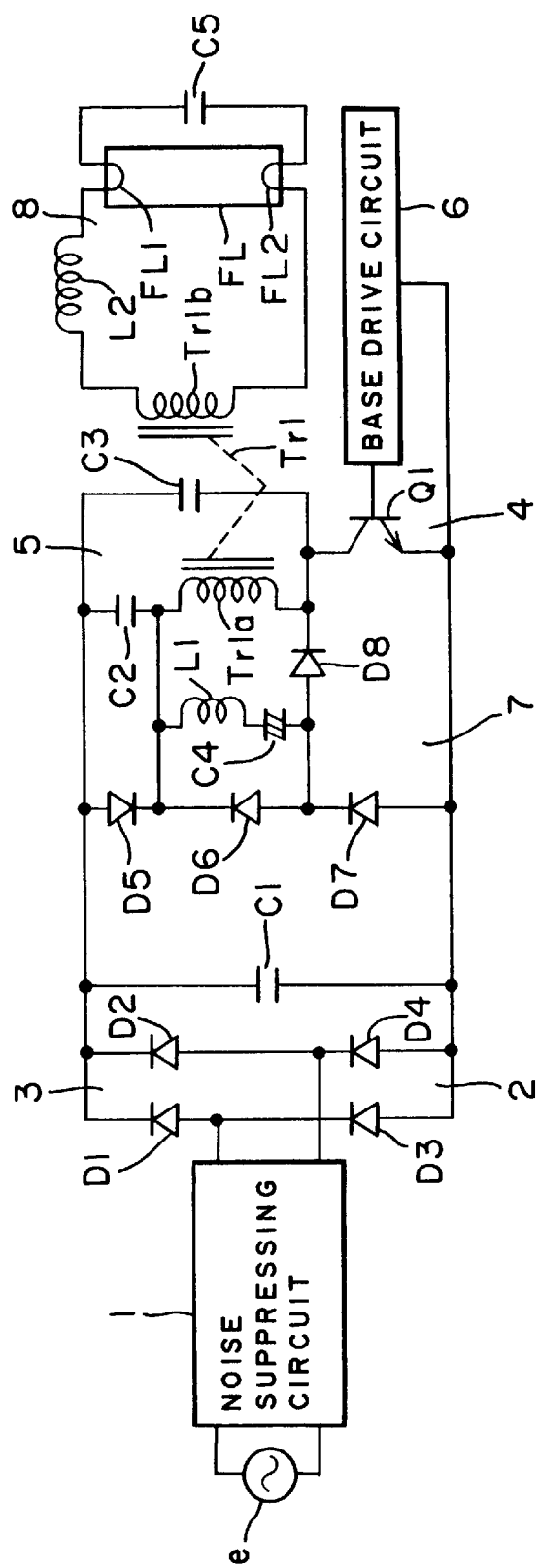
FIG. 1 is a circuit diagram of a discharge lamp lighting device as a power supply device according to a first embodiment of the present invention.

Next, the configuration of a power supply device according to an embodiment of the invention is explained hereunder, referring to the drawings.

As shown in FIG. 1, a non-smoothing power supply 3 is formed by connecting a noise suppressing circuit 1 to a commercial AC power supply e, connecting an input terminal of a full-wave rectifying circuit 2 to the noise suppressing circuit 1, and connecting a first condenser C1 for the non-smoothing function to an output terminal of the full-wave rectifying circuit 2. Full-wave rectifying circuit 2 is composed of a bridge of diodes D1, D2, D3, D4 and serves as a rectifying means.

Connected to the non-smoothing power supply 3 described above is an inverter circuit 4 which includes a parallel resonance circuit 5. The parallel resonance circuit 5 is formed by connecting a first auxiliary condenser C2, which serves as a first auxiliary capacitor, in series with a primary winding Tr1a of an inverter transformer Tr1. Condenser C3 is connected in parallel with the series circuit consisting of primary winding Tr1a of inverter transformer Tr1 and first auxiliary condenser C2. Diode D5 is connected in parallel with first auxiliary condenser C2. Primary winding Tr1a serves as an inductor that acts as a phase-advancing impedance, while main condenser C3 serves as a main capacitor that acts as a phase-delaying impedance.

A collector-emitter of a transistor Q1 which serves as a switching element is connected in series with parallel resonance circuit 5. The emitter of transistor Q1 is connected to the negative electrode of full-wave rectifying circuit 2. The collector of transistor Q1 is connected at a node between primary winding Tr1a of inverter transformer Tr1 and main condenser C3. A base drive circuit 6 acting as a control circuit is connected to the base of transistor Q1 and is used to control the operating state of transistor Q1.

A partial smoothing circuit 7 is connected to first condenser C1. Partial smoothing circuit 7 is formed by connecting a series circuit consisting of a diode D6, a discharge diode D7, and diode D5 in parallel with first condenser C1. Diode D6 is connected in parallel to a series circuit consisting of a choke coil L1 and a smoothing condenser C4. Diode D6 is also connected to primary winding Tr1a of inverter transformer Tr1 with a charge diode D8 therebetween. Choke coil L1 has a function of limiting sudden electrical charge and discharge. The series circuit consisting of diode D6 and diode D7 mentioned above is connected in reversed polarity with respect to diode D5.

A lighting circuit 8 is formed by connecting filaments FL1, FL2 of a fluorescent lamp FL through a ballast L2 to a secondary winding Tr1b of inverter transformer Tr1 and connecting a starting condenser C5 to filaments FL1, FL2. In this circuit, fluorescent lamp FL serves as a discharge lamp to act as a lagging load.

Next, the function of the embodiment described above is explained hereunder.

Figure 2:
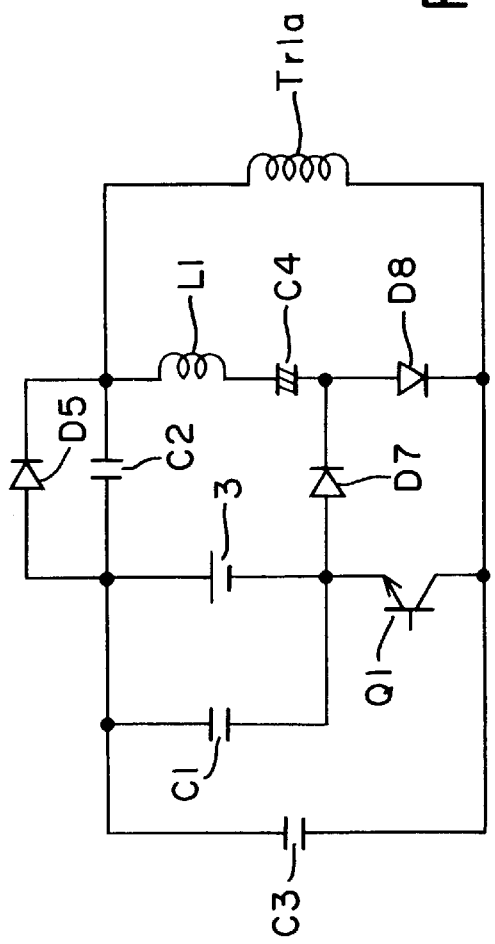
FIG. 2 is a simplified equivalent circuit diagram of the device shown in FIG. 1.

Referring to FIG. 2, which is a simplified equivalent circuit of FIG. 1, basic energy of parallel resonance circuit 5 is fed from non-smoothing power supply 3 during the non-smoothing action and fed from partial smoothing circuit 7 during the partially-smoothing action.

Energy for high frequency oscillation is supplied from first condenser C1 and first auxiliary condenser C2, both of which have a low impedance of high frequency and are connected with non-smoothing power supply 3. To be more precise, energy is fed from first condenser C1 during the non-smoothing action, because diode D5 is in normal polarity with respect to non-smoothing power supply 3. On the other hand, when transistor Q1 is in the off state during the partially-smoothing action, current flows along the path from condenser C4 through choke coil L1 and first auxiliary condenser C2 to diode D7 and then back to the condenser C4. This is because diode D5 is in reversed polarity with respect to partial smoothing circuit 7. Therefore, first auxiliary condenser C2 and first condenser C1 are charged as a result of discharge of the condenser C4. When transistor Q1 is turned on, current flows along the path from first condenser C1 through first auxiliary condenser C2 and primary winding Tr1a of inverter transformer Tr1 to transistor Q1 and then back to first condenser C1 so that choke coil L1 is charged as a result of discharge from first condenser C1 and first auxiliary condenser C2.

By setting the capacitance of first condenser C1 substantially larger than that of first auxiliary condenser C2 and setting the capacitance of first auxiliary condenser C2 so that first auxiliary condenser C2 repeats a cycle of a virtually full charge and a virtually full discharge at every cycle of the partially smoothing action, high frequency oscillation is generated on first auxiliary condenser C2. As a result, when the voltage of first auxiliary condenser C2 decreases due to discharge current is supplied from first condenser C1 to first auxiliary condenser C2. Thus, input current continues to flow, and high harmonic elements in the input current are reduced.

During the non-smoothing action, partial smoothing circuit 7 causes high frequency oscillation to be generated at the connection between non-smoothed power supply 3 and parallel resonance circuit 5 by means of turning transistor Q1 on or off and charging condenser C4 through diode D8. When the partial smoothing action is underway, partial smoothing circuit 7 turns transistor Q1 on or off through diode D7, thereby generating high frequency oscillation at the connection point where partial smoothing circuit 7 and parallel resonance circuit 5 are connected. In other words, transistor Q1 is switched by means of diode D7, which is automatically turned off at the initiation of the non-smoothing action and turned on at the initiation of the partial smoothing action.

If the full cycle of commercial AC power supply e is completely smoothed, the entire cycle of the smoothed power supply becomes flat so that the peak value of lamp current is reduced, and the peak-value characteristic of the lamp current is improved. As a result, the power consumption efficiency of the lamp is increased to the maximum extent and flickers are eliminated. However, since such a full smoothing circuit requires accumulation of energy sufficient for the full cycle, its structure becomes inevitably complicated and large. For this reason, partial smoothing circuit 7 is employed. The configuration including partial smoothing circuit 7 enables the reduction of the size of the device, because it is sufficient to accumulate energy for the trough portions. Furthermore, it includes a period for conducting a non-smoothing action where crest portions of full-wave rectification waveforms appear and a period for conducting a partially-smoothing action where the troughs are flatly smoothed. Since there is no interruption in current flow in the trough portions, flickers are nearly completely eliminated resulting in superior power consumption of fluorescent lamp FL.

Base drive circuit 6 controls switching of transistor Q1. When transistor Q1 is on, base drive circuit 6 charges primary winding Tr1a of inverter transformer Tr1, thereby feeding and accumulating energy to generate forced oscillation. When transistor Q1 is off, the accumulated energy is transferred to the main condenser C3, thereby permitting free oscillation. Through repetition of the above action, high frequency voltage is induced on secondary winding Tr1b of inverter transformer Tr1 so that lighting fluorescent lamp FL is actuated at a high frequency.

Fluorescent lamp FL is a phase delaying load, which enables the easy retrieval of energy through inverter transformer Tr1 thereby ensuring superior continuity of electric current. The circuit described above, however, requires a path of current to be formed at the side where primary winding Tr1a of inverter transformer Tr1 is located at the time of forced oscillation when transistor Q1 is on.

Figure 3:
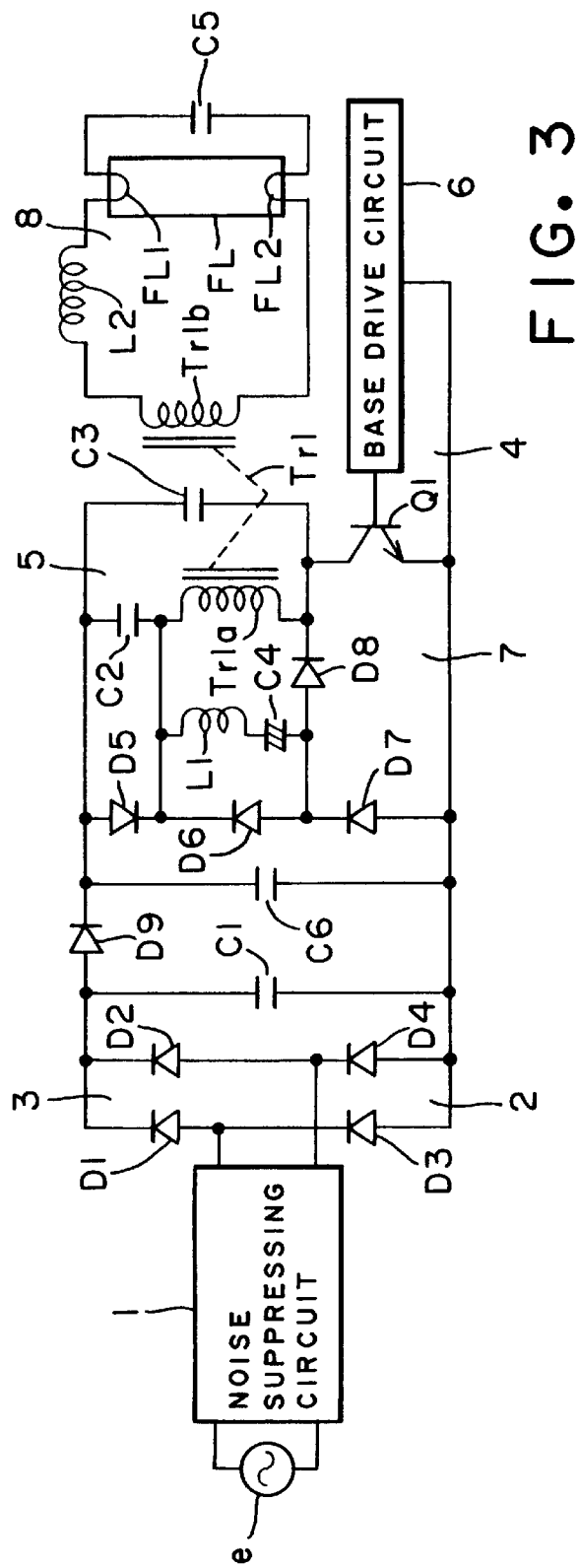
FIG. 3 is a circuit diagram of a discharge lamp lighting device according to another embodiment of the present invention.

Next, another embodiment is explained referring to a discharge lamp lighting device shown in FIG. 3.

The discharge lamp lighting device shown in FIG. 3 has the same configuration as that of the discharge lamp lighting device shown in FIG. 1 except that a second condenser C6 is connected, through a diode D9, in parallel with first condenser C1.

Figure 4:
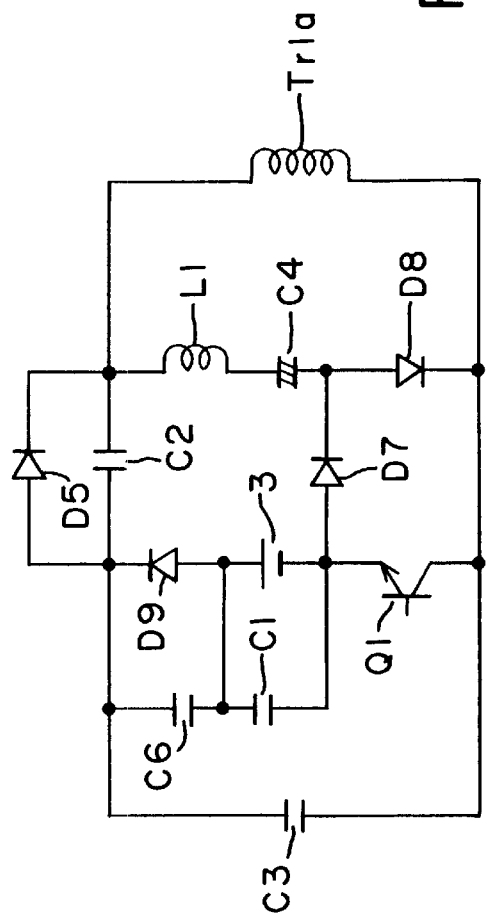
FIG. 4 is a simplified equivalent circuit diagram of the device shown in FIG. 3.

As is evident from a simplified equivalent circuit shown in FIG. 4, the configuration shown in FIG. 3 increases the number of components because of the additional two components, i. e. diode D9 and second condenser C6. On the other hand, by allocating a part of the function of diode D5 and first auxiliary condenser C2 to diode D9 and second condenser C6, the above configuration enables various adjustments. For example, adjustment of output frequency and adjustment of current and voltage of parallel resonance circuit 5 is enabled. Adjustment of functional criteria, such as frequency and degree of resonance, of parallel resonance circuit 5 including the high frequency oscillation voltage of first auxiliary condenser C2 is also possible. Therefore, the above configuration increases the flexibility allowed in the design, and so is capable of reducing high harmonic elements in the input current and improving the crest factor of the lamp current.

Figure 5:
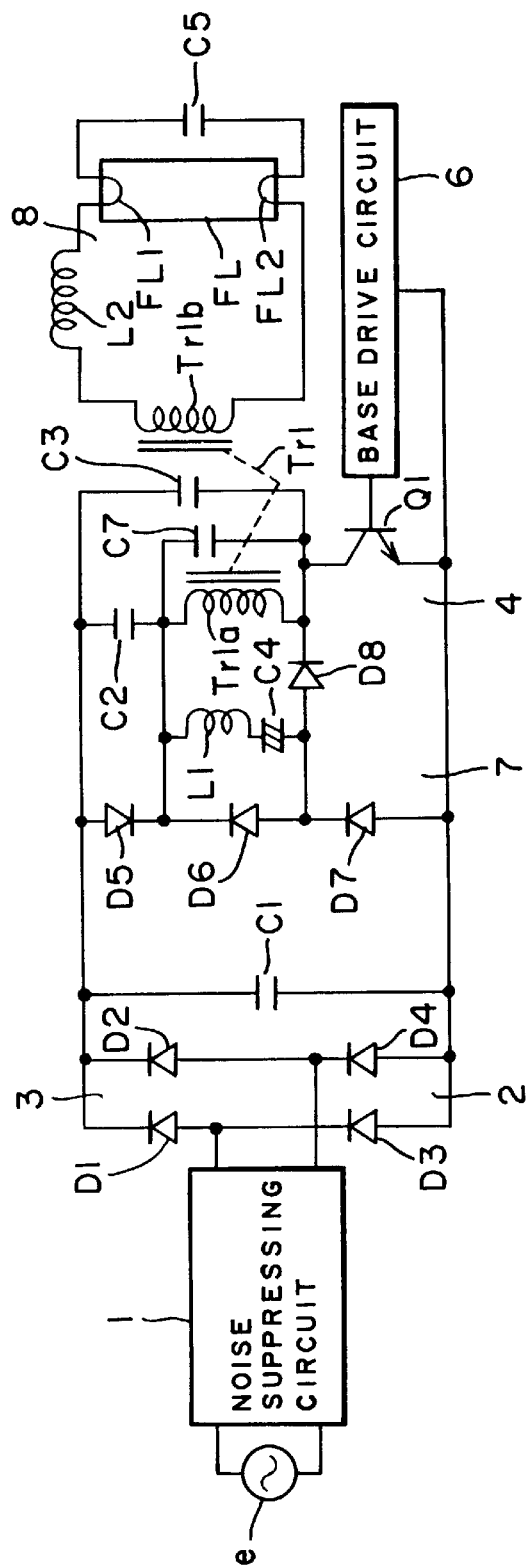
FIG. 5 is a circuit diagram of a discharge lamp lighting device according to yet another embodiment of the present invention.

Next, yet another embodiment is explained, referring to a discharge lamp lighting device shown in FIG. 5.

The discharge lamp lighting device shown in FIG. 5 has the same configuration as that of the discharge lamp lighting device shown in FIG. 1 except that a second auxiliary condenser C7 serving as the second auxiliary capacitor for achieving parallel resonance, is connected in parallel with primary winding Tr1a of inverter transformer Tr1.

Figure 6:
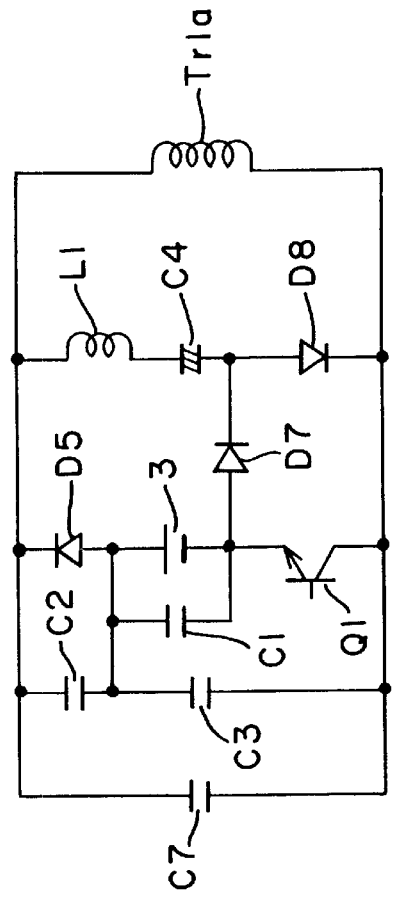
FIG. 6 is a simplified equivalent circuit diagram of the device shown in FIG. 5.

As is evident from a simplified equivalent circuit shown in FIG. 6, by connecting second auxiliary condenser C7 in parallel with primary winding Tr1a of inverter transformer Tr1, the configuration shown in FIG. 5 enables the adjustment of the amount of energy of high frequency oscillation generated by parallel resonance of diode D5 and first auxiliary condenser C2 and also enables other various adjustments. For example, adjustment of output frequency and adjustment of current and voltage of parallel resonance circuit 5 is enabled. Adjustment of functional criteria such as frequency and degree of resonance of parallel resonance circuit 5 including the high frequency oscillation voltage of first auxiliary condenser C2 is also possible. Therefore, the above configuration increases the flexibility allowed in the design and so reduction of high harmonic elements in the input current and improvement of the crest factor of the lamp current can be easily achieved.

Figure 7:
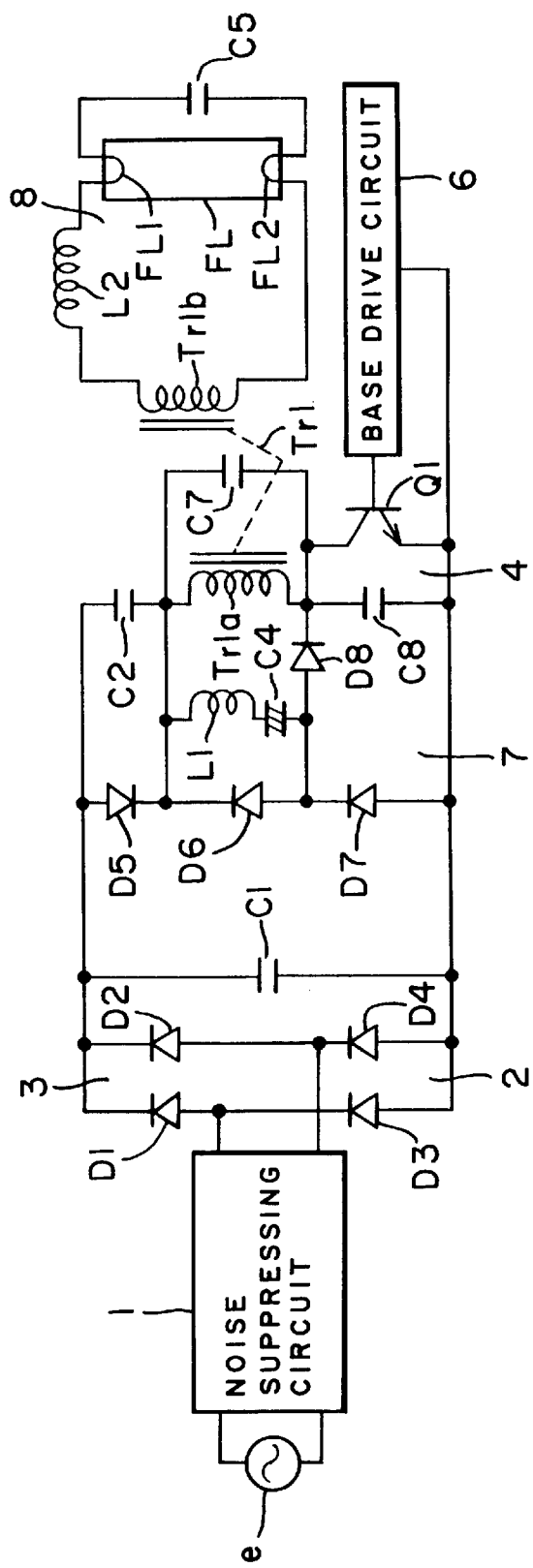
FIG. 7 is a circuit diagram of a discharge lamp lighting device according to yet another embodiment of the present invention.

Yet another embodiment is explained, referring to a discharge lamp lighting device shown in FIG. 7.

The discharge lamp lighting device shown in FIG. 7 has the same configuration as that of the discharge lamp lighting device shown in FIG. 5 except that, main condenser C3 is removed and a main condenser C8 serving as the main capacitor is disposed between, and connected to, the collector and the emitter of transistor Q1 so that main condenser C8 is connected in series with first auxiliary condenser C1. As the capacitance of first condenser C1 is substantially larger than the capacitance of main condenser C8, the device functions in the same manner as the discharge lamp lighting device shown in FIG. 5.

Figure 8:
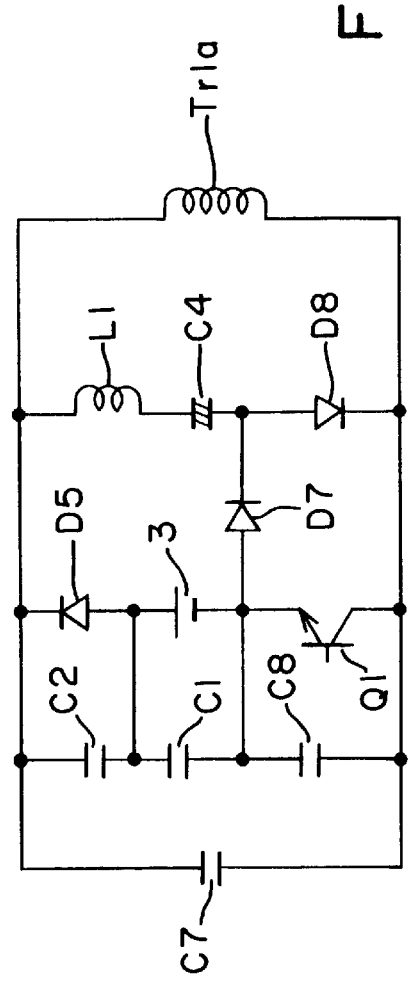
FIG. 8 is a simplified equivalent circuit diagram of the device shown in FIG. 7.

As is evident from a simplified equivalent circuit shown in FIG. 8, by connecting second auxiliary condenser C7 in parallel with primary winding Tr1a of inverter transformer Tr1 in the same manner as the configuration shown in FIG. 5, the configuration shown in FIG. 7 enables the adjustment of the amount of energy of high frequency oscillation generated by parallel resonance of the diode D5 and first auxiliary condenser C2 and also enables other various adjustments. For example, adjustment of output frequency and adjustment of current and voltage of parallel resonance circuit 5, and adjustment of functional criteria, such as frequency and degree of resonance of parallel resonance circuit 5 including the high frequency oscillation voltage of the first auxiliary condenser C2, are all possible. Therefore, the above configuration increases the flexibility allowed in the design. Also, the reduction of high harmonic elements in the input current and improvement of the crest factor of the lamp current can be easily achieved.

Figure 9:
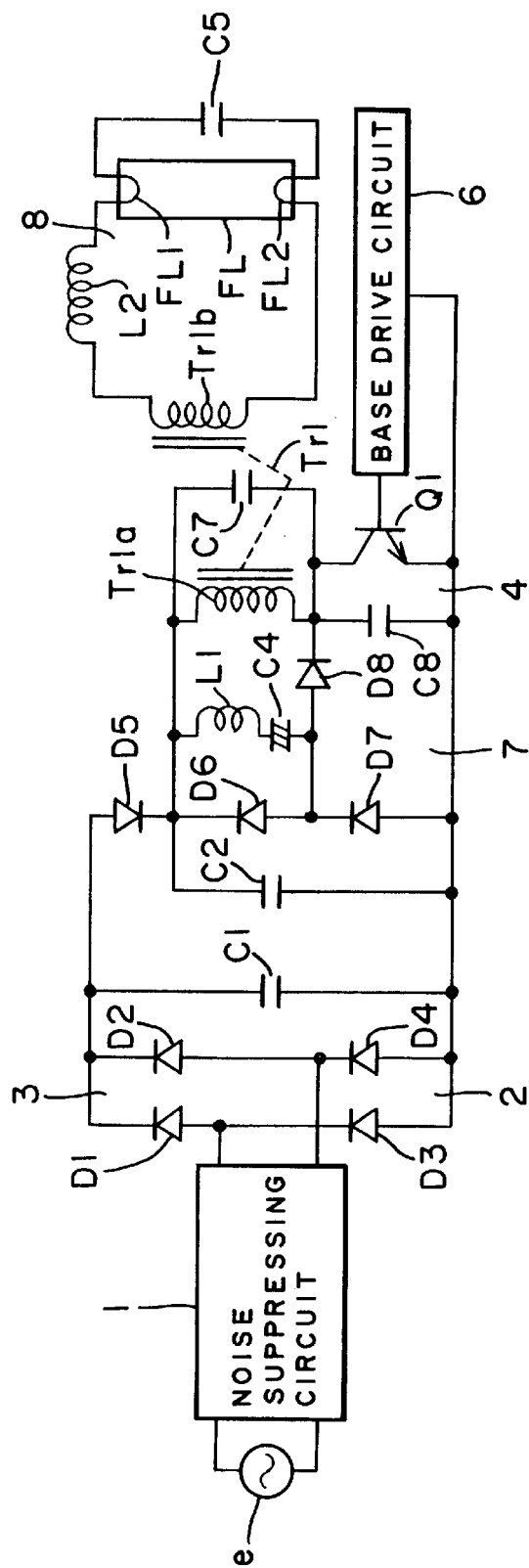
FIG. 9 is a circuit diagram of a discharge lamp lighting device according to yet another embodiment of the present invention.

Yet another embodiment is explained, referring to a discharge lamp lighting device shown in FIG. 9.

The discharge lamp lighting device shown in FIG. 9 has the same configuration as that of the discharge lamp lighting device shown in FIG. 7 except that the first auxiliary condenser C2 is connected to the negative electrode side of non-smoothed power supply 3. First auxiliary condenser C2 is also connected to the cathode end of diode D5 instead of being in parallel with diode D5. Since the capacitance of first condenser C1 is substantially larger than the capacitance of main condenser C8, the device functions in the same manner as the discharge lamp lighting device shown in FIG. 5.

Figure 10:
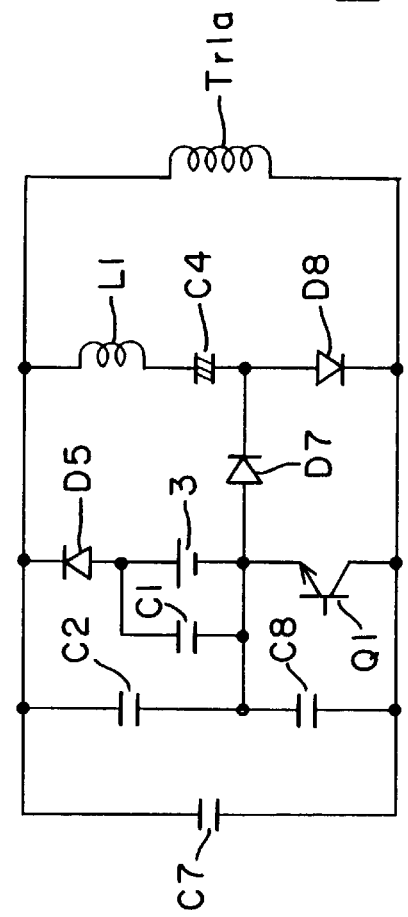
FIG. 10 is a simplified equivalent circuit diagram of the device shown in FIG. 9.

As is evident from a simplified equivalent circuit shown in FIG. 10, by connecting second auxiliary condenser C7 in parallel with primary winding Tr1a of inverter transformer Tr1 in the same manner as the configuration shown in FIG. 7, the configuration shown in FIG. 9 enables the adjustment of the amount of energy of high frequency oscillation generated by parallel resonance of diode D5 and first auxiliary condenser C2 and also enables other various adjustments. For example, adjustment of output frequency and adjustment of current and voltage of parallel resonance circuit 5, and adjustment of functional criteria, such as frequency and degree of resonance of parallel resonance circuit 5 including the high frequency oscillation voltage of first auxiliary condenser C2, are all possible. Therefore, the above configuration increases the flexibility allowed in the design. Also reduction of high harmonic elements in the input current and improvement of the crest factor of the lamp current can be easily achieved.

Next, the functions of the above embodiments are explained hereunder, referring to comparative examples depicted in FIGS. 11–14.

Figure 11:
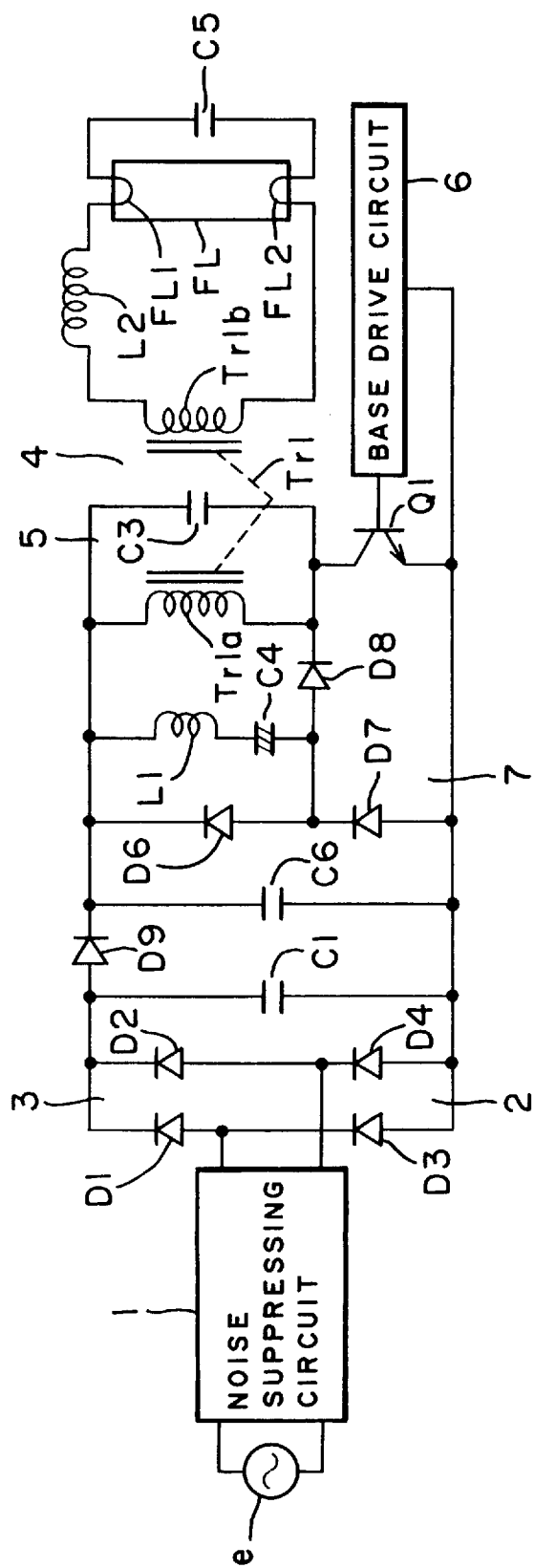
FIG. 11 is a circuit diagram of a discharge lamp lighting device according to a first comparative example.
Figure 12:
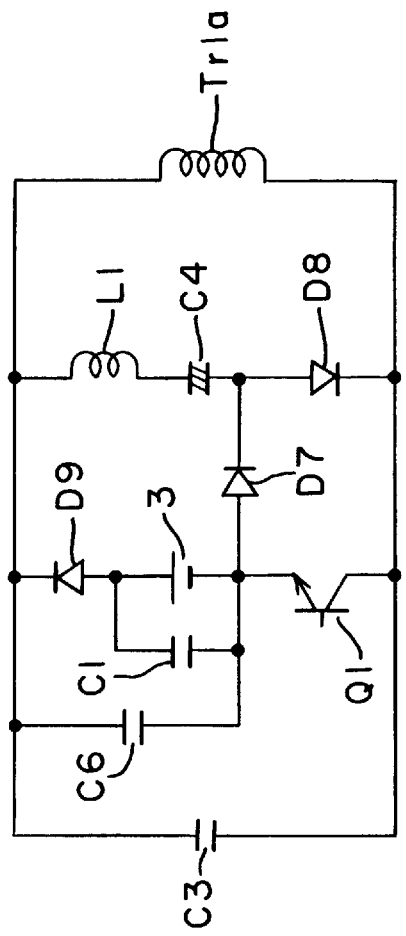
FIG. 12 is a simplified equivalent circuit diagram of the device shown in FIG. 11.

As shown in FIG. 11, a discharge lamp lighting device according to the first comparative example has the same configuration as that of the discharge lamp lighting device shown in FIG. 3 except that diode D5 and first auxiliary condenser C2 are not included. The configuration of the first comparative example is represented by the simplified equivalent circuit shown in FIG. 12.

Figure 13:
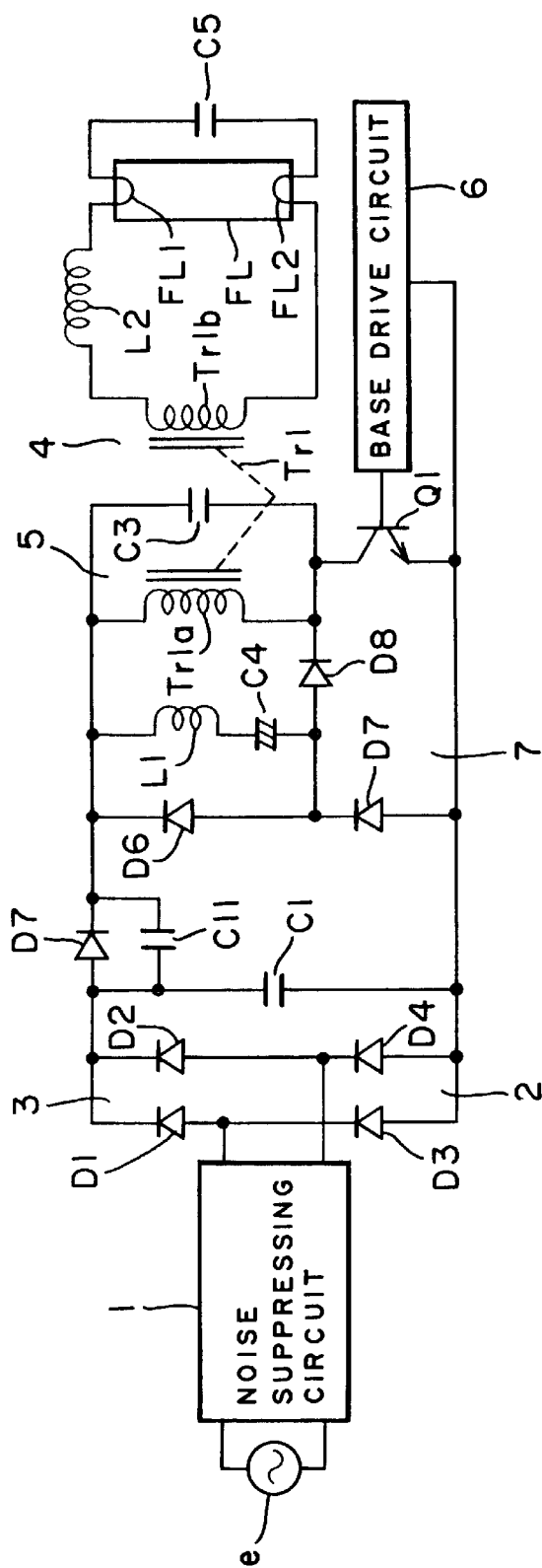
FIG. 13 is a circuit diagram of a discharge lamp lighting device according to a second comparative example.
Figure 14:
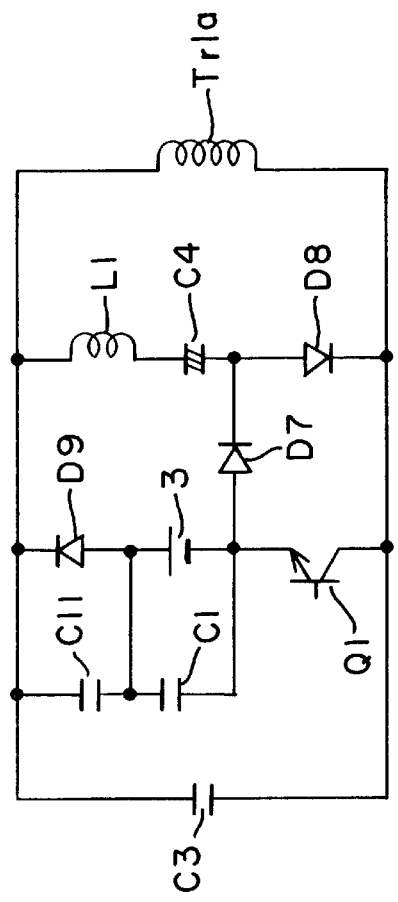
FIG. 14 is a simplified equivalent circuit diagram of the device shown in FIG. 13.

As, shown in FIG. 13, a discharge lamp lighting device according to the second comparative example has the same configuration as that of the discharge lamp lighting device shown in FIG. 11 except that second condenser C6 is excluded and that a second condenser C11 is connected in parallel with diode D9. The configuration of the second comparative example is represented by the simplified equivalent circuit shown in FIG. 14. Since the capacitance of second condenser C11 is substantially smaller than the capacitance of first condenser C1, the device functions in the same manner as the discharge lamp lighting device according to the first comparative example Comparison of the discharge lamp lighting device shown in the FIGS. 1 and 2 with the first comparative example shown in FIGS. 11 and 12 and the second comparative example shown in FIGS. 13 and 14 indicates that the discharge lamp lighting device shown in FIGS. 1 and 2 is different from the two comparative examples in that the diode D5 and the first auxiliary condenser C2, which serve to generate high frequency waves, are included in parallel resonance circuit 5 of FIGS. 1 and 2.

Throughout the partial smoothing action, high frequency oscillation energy generated on first auxiliary condenser C2 is superimposed over the basic energy in partial smoothing circuit 7 and flows into primary winding Tr1a of the inverter transformer Tr1. The configuration shown in FIGS. 1 and 2 permits forced oscillation current to flow, thereby ensuring continuous flow of input current, and so it is capable of reducing high harmonics.

In cases where diode D5 and first auxiliary condenser C2 are included in parallel resonance circuit 5, energy charged in primary winding Tr1a of inverter transformer Tr1 during the forced oscillation process causes a sudden flow of electric current. This current flows along the path from primary winding Tr1a through main condenser C3, to either diode D5 or first auxiliary condenser C2 and then back to primary winding Tr1a when free oscillation is conducted following the forced oscillation. This sudden flow of current, which is caused by counter-electromotive force generated on the primary winding Tr1a as a result of switching off of transistor Q1 results in electrical discharge from primary winding Tr1a and charge on first auxiliary condenser C2.

As the electric potential at the end of first auxiliary condenser C2 connected to primary winding Tr1a, gradually increases, first auxiliary condenser C2 is charged. When the discharge from primary winding Tr1a is about to end as the energy of primary winding Tr1a is used up, first auxiliary condenser C2 begins to discharge, thereby permitting electric current to flow along the path from first auxiliary condenser C2 through primary winding Tr1a to main condenser C3 and then back to the first auxiliary condenser C2. This means that free oscillation is strengthened from the energy in primary winding Tr1a, and the time constant of the oscillation is therefore increased. As free oscillation is strengthened from the energy in primary winding Tr1a, the injection efficiency of the energy charged on primary winding Tr1a during the forced oscillation, or the efficiency of the forced oscillation, is improved.

High frequency energy is generated by first auxiliary condenser C2 and diode D5 during the free oscillation of parallel resonance circuit 5 when transistor Q1 is in the off state. This means that the length of the period of free oscillation increases regardless of whether a non-smoothing action is occurring or a partial smoothing action occurring. Therefore, as the energy of the direct current is superimposed over the lamp current, the above configuration prevents unbalanced current, thereby preventing cataphoresis and ground noise.

In addition, as the increase in the length of the period of free oscillation reduces the rate of change of parallel resonance current, the maximum parallel resonance current and voltage can be reduced if the effective output is maintained constant. Therefore, the above configuration is also capable of increasing the efficiency of parallel resonance.

Due to the existence of high frequency oscillation energy of first auxiliary condenser C2, the high frequency oscillation energy increases during a partial smoothing action. This corresponds to a trough portion of parallel resonance. As a result, the entire high frequency oscillation energy is consumed by the parallel resonance between primary winding Tr1a, main condenser C3, and first auxiliary condenser C2 of parallel resonance circuit 5, thereby efficiently strengthening the parallel resonance. By thus increasing the amount of lamp current during the period of partial smoothing action, the configuration described above improves the crest factor of lamp current and reduces the stress applied to fluorescent lamp FL.

As parallel resonance circuit 5 including diode D5 and first auxiliary condenser C2 function independently of transistor Q1, free oscillation using the energy of primary winding Tr1a is strengthened when free oscillation is underway. As the efficiency of the energy injected into primary winding Tr1a of the parallel resonance circuit 5 is increased when forced oscillation is underway, (in other words as a result of the increase in the efficiency of forced oscillation) the maximum current of non-smoothed power supply 3 and of transistor Q1 injected during the forced oscillation can be reduced. Furthermore, as the improved efficiency of parallel resonance results in the increase in the length of the period of free oscillation, the above configuration prevents backward voltage from being applied to partial smoothing circuit 7 or transistor Q1 and, therefore, reduces the maximum voltage to be applied to non-smoothed power supply 3 and transistor Q1 during the free oscillation. This allows the usage of a transistor Q1 having a low capacity and, therefore, making it possible to reduce the size and costs of the device.

During free oscillation, first auxiliary condenser C2 and diode D5 included in parallel resonance circuit 5 (which is provided independently of transistor Q1) strengthen parallel resonance circuit 5 regardless of transistor Q1 and thereby increase the efficiency of the circuit. This feature results from the effect of energy of high frequency oscillation energy of first auxiliary condenser C2 and diode D6 of monolithic parallel resonance circuit 5 and cannot be obtained by other methods of resonance. Examples of other methods include a 4-crystal full-bridge method and a 2-crystal half-bridge method, both of which call for including a switching element in the resonance circuit. For this reason, regardless of whether a non-smoothing action or a partial smoothing action is being conducted, neither method is capable of preventing increase of current in the non-smoothed power supply and the switching element when the strength of resonance increases.

Regarding conditions of the phase of current during forced oscillation, diode D5 is in normal polarity during forced oscillation in the non-smoothing action so that first auxiliary condenser C2 is short-circuited. Therefore, current input to parallel resonance circuit 5 is fed from first condenser C1 which permits forced current to flow into the path that includes primary winding Tr1$a$ and transistor Q1 located at the phase-delaying impedance side of parallel resonance circuit 5. During forced oscillation in the partial-smoothing action, diode D5 is in reversed polarity so that high frequency oscillation voltage is generated on first auxiliary condenser C2. Viewed from partial smoothing circuit 7, however, first auxiliary condenser C2 is in parallel with primary winding Tr1$a$ at the phase-delaying impedance side to which forced oscillation current should flow. Therefore, forced current is permitted to flow from partial smoothing circuit 7, which serves as the source of the basic energy during a partial smoothing action, into the path that includes primary winding Tr1$a$ and transistor Q1 located at the phase-delaying impedance side of parallel resonance circuit 5.

Referring to a comparative example, explanation is now given with regard to a case where the phase during forced oscillation is not appropriate.

Figure 15:
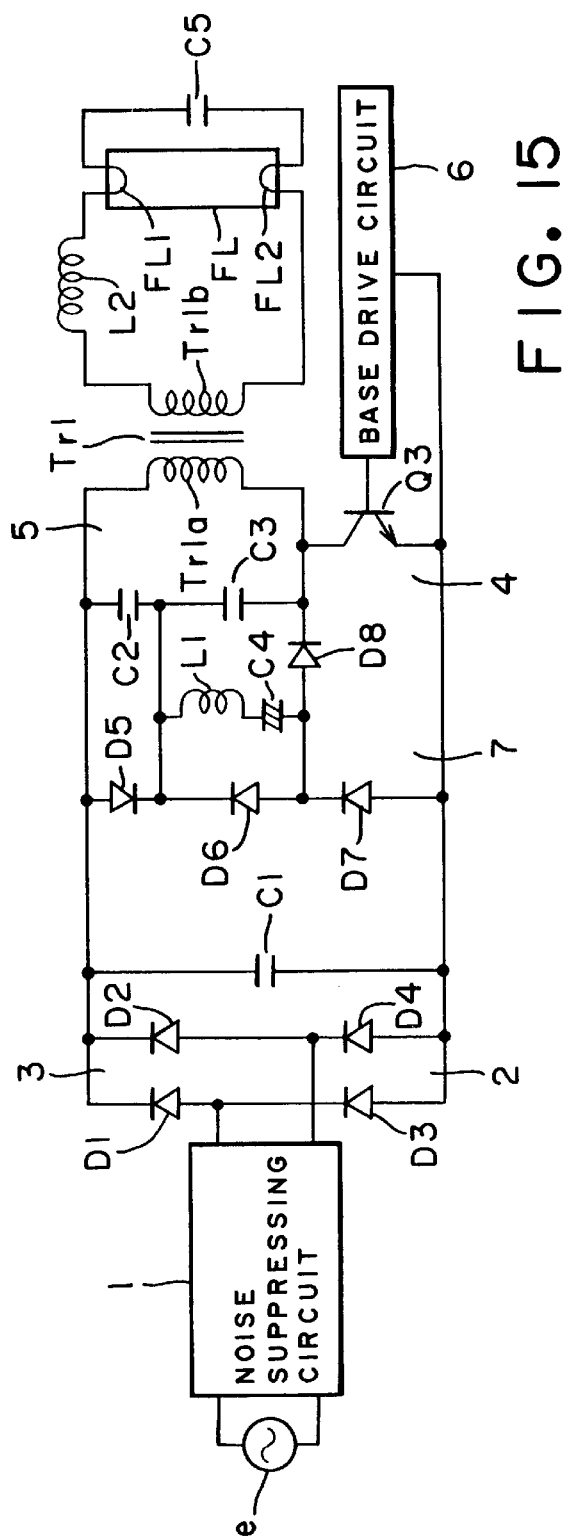
FIG. 15 is a circuit diagram of a discharge lamp lighting device according to a third comparative example.

As shown in FIG. 15, a discharge lamp lighting device according to the third comparative example has the same configuration as the discharge lamp lighting device shown in FIG. 1, except that primary winding Tr1$a$ of inverter transformer Tr1 and main condenser C3 have switched positions. This configuration is represented by the simplified equivalent circuit shown in FIG. 16.

Figure 16:
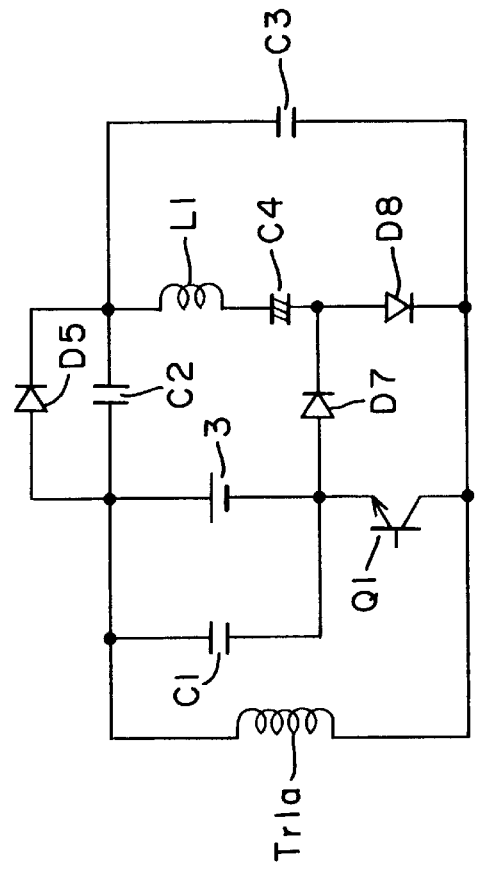
FIG. 16 is a simplified equivalent circuit diagram of the device shown in FIG. 15.

According to the third comparative example shown in FIGS. 15 and 16, primary winding Tr1$a$ for flowing forced oscillation current during the partial smoothing action and first auxiliary condenser C2 for generating high frequency oscillation, are coupled together. Therefore, in order to make the circuit that consists of primary winding Tr1$a$ and first auxiliary condenser C2 a phase-delaying component, either primary winding Tr1$a$ or first auxiliary condenser C2 has to be sufficiently large. This, however, makes it difficult to ensure stable parallel resonance and reduction of high harmonic elements in input current.

Figure 17:
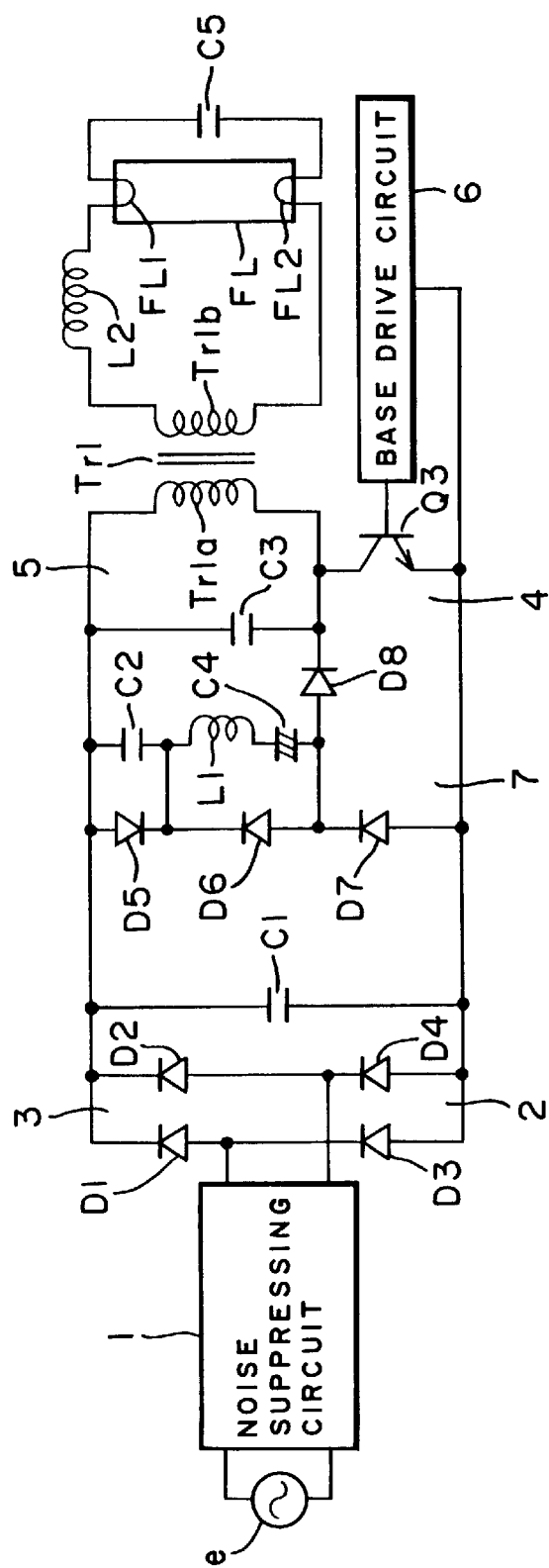
FIG. 17 is a circuit diagram of a discharge lamp lighting device according to a fourth comparative example.

As shown in FIG. 17, a discharge lamp lighting device according to the fourth comparative example has the same configuration as the discharge lamp lighting device shown in FIG. 15 except that main condenser C3 is connected in parallel with primary winding Tr1$a$ of inverter transformer Tr1 and first auxiliary condenser C2 is disposed between where partial smoothing circuit 7 and primary winding Tr1$a$. This configuration is represented by the simplified equivalent circuit shown in FIG. 18.

Figure 18:
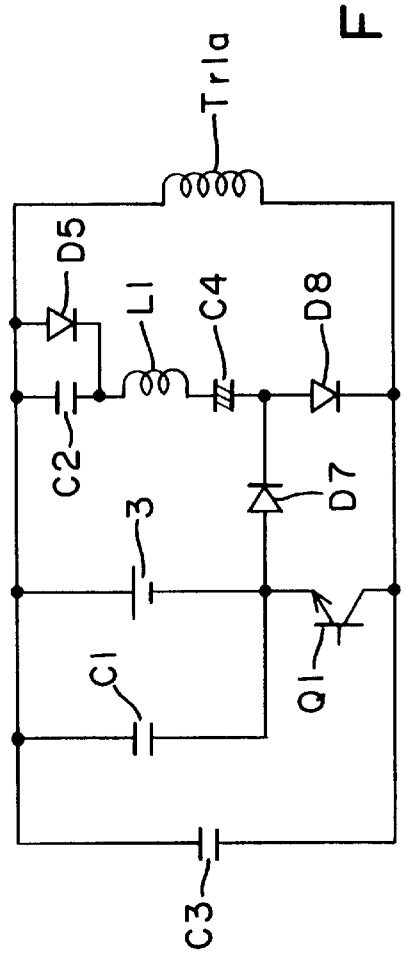
FIG. 18 is a simplified equivalent circuit diagram of the device shown in FIG. 17.

According to the fourth comparative example shown in FIGS. 17 and 18, primary winding Tr1$a$ for flowing forced oscillation current during the partial smoothing action, and the components for generating high frequency oscillation, i. e. first auxiliary condenser C2 and diode D6, are coupled together. Therefore, in order to make the circuit that consists of primary winding Tr1$a$ and first auxiliary condenser C2 a phase-delaying component, either primary winding Tr1$a$ or first auxiliary condenser C2 has to be sufficiently large. This, however, makes it difficult to ensure stable parallel resonance and reduction of high harmonic elements in input current.

With a parallel resonance circuit 5 of any 1-crystal type, the same effect can be achieved by disposing first auxiliary condenser C2 and diode D5 in the free oscillation path of resonance circuit 5 so that they function independently of transistor Q1 during free oscillation. In this configuration, the current path during forced oscillation functions as the phase-delaying path.

Next, the discharge lamp lighting device shown in FIGS. 1 and 2, the discharge lamp lighting device shown in FIGS. 3 and 4, and the discharge lamp lighting device according to the first comparative example are explained hereunder, referring to results of experiments.

Two 200-V fluorescent lamps FL having an HF of 45 are used in every experiment.

First, the discharge lamp lighting device shown in FIGS. 1 and 2 includes first condenser C1 having a capacitance of 100000 pF, first auxiliary condenser C2 having a capacitance of 33000 pF, condenser C4 having a capacitance of 100 $\mu$F, choke coil L1 having an inductance of 2.2 mH, primary winding Tr1$a$ having an inductance of 1.78 mH, and main condenser C3 having a capacitance of 5800 pF.

The discharge lamp lighting device shown in FIGS. 3 and 4 includes first condenser C1 having a capacitance of 120000 pF, first auxiliary condenser C2 having a capacitance of 39000 pF, second condenser C6 having a capacitance of 8000 pF, condenser C4 having a capacitance of 100 $\mu$F, choke coil L1 having an inductance of 2.2 mH, primary winding Tr1$a$ having an inductance of 1.78 mH, and main condenser C3 having a capacitance of 6600 pF.

The discharge lamp lighting device according to the first comparative example includes first condenser C1 having a capacitance of 240000 pF, second condenser C6 having a capacitance of 22000 pF, condenser C4 having a capacitance of 100 $\mu$F, choke coil L1 having an inductance of 2.2 mH, primary winding Tr1$a$ having an inductance of 1.38 mH, and main condenser C3 having a capacitance of 8200 pF.

Electrical characteristics of these discharge lamp lighting devices, such as input current, input power, power factor, lamp current, lamp power, and lamp crest factor, are as shown in Table 1 below:

TABLE 1

|   | ① | ② | ③ | ④ | ⑤ | ⑥ |
|---|------|------|-------|-------|------|------|
| A | 0.501 | 99.3 | 0.991 | 0.364 | 83.0 | 1.63 |
| B | 0.502 | 99.5 | 0.991 | 0.369 | 83.0 | 1.66 |
| C | 0.499 | 99.1 | 0.993 | 0.378 | 83.0 | 1.85 | where:
A: the discharge lamp lighting device shown in FIGS. 1 and 2
B: the discharge lamp lighting device shown in FIGS. 3 and 4
C: the discharge lamp lighting device according to the first comparison example and
①: input current
②: input power
③: power factor
④: lamp current
⑤: lamp power
⑥: lamp crest factor As it is evident from the above test results, all the samples showed high power factors. Further, in spite of the same lamp power, compared with the comparative example, the devices according to the invention showed lower lamp current values and improvement both in lamp power efficiencies and lamp crest factors.

Figure 19:
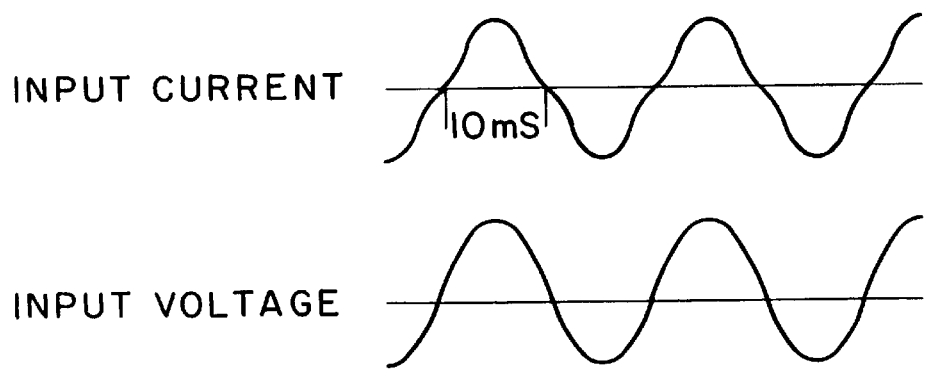
FIG. 19 is a waveform illustration showing the input current waveform and the input voltage waveform of the discharge lamp lighting device shown in FIGS. 1 and 2.
Figure 20:
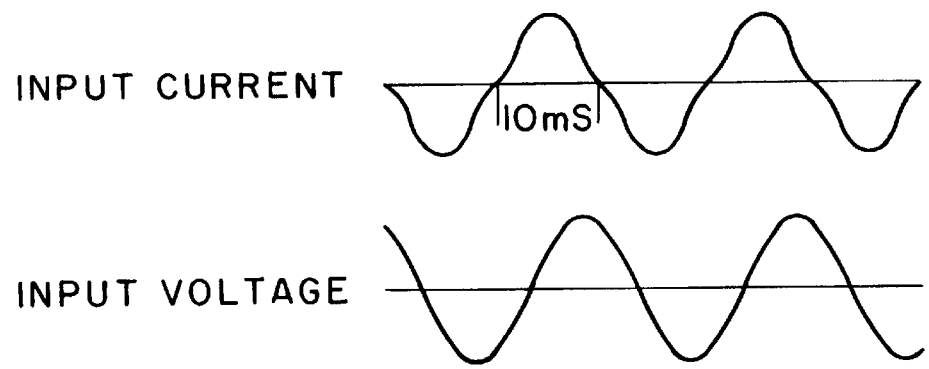
FIG. 20 is a waveform illustration showing the input current waveform and the input voltage waveform of the discharge lamp lighting device shown in FIGS. 3 and 4.
Figure 21:
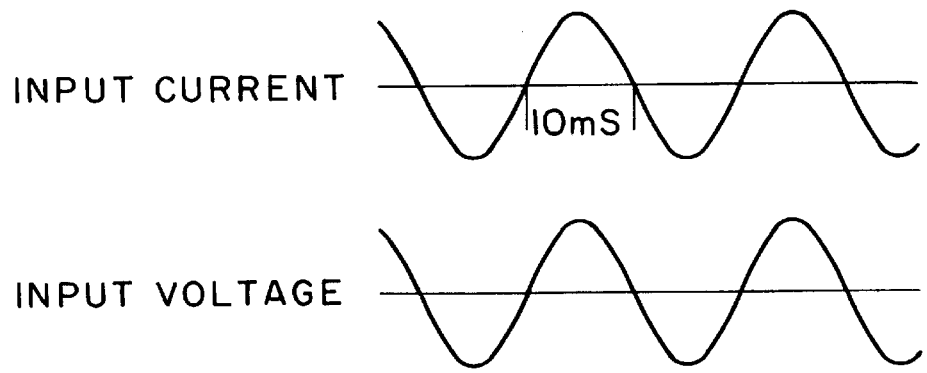
FIG. 21 is a waveform illustration showing the input current waveform and the input voltage waveform of the discharge lamp lighting device of the first comparative example shown in FIGS. 11 and 12.
Figure 22:
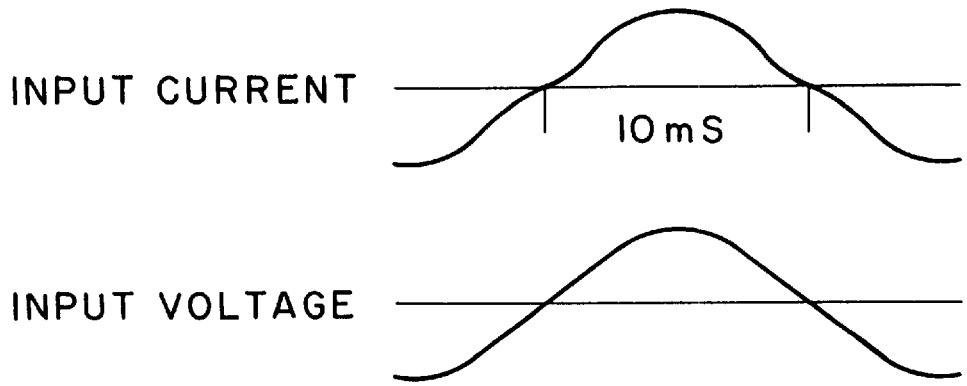
FIG. 22 is an enlarged waveform illustration of FIG. 19.
Figure 23:
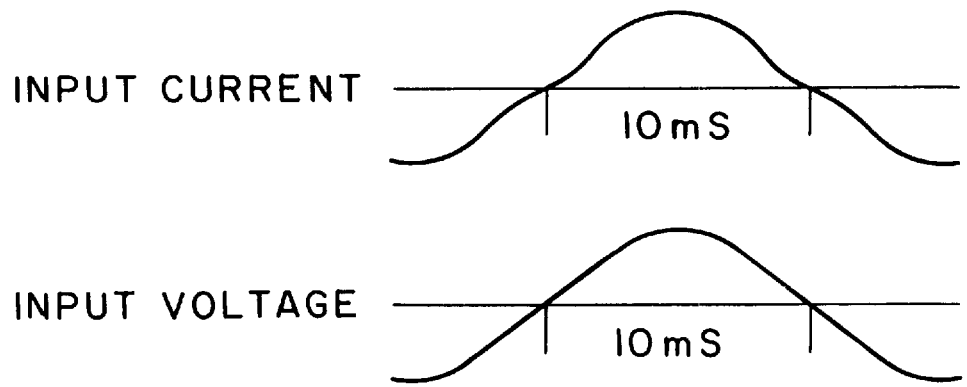
FIG. 23 is an enlarged waveform illustration of FIG. 20.
Figure 24:
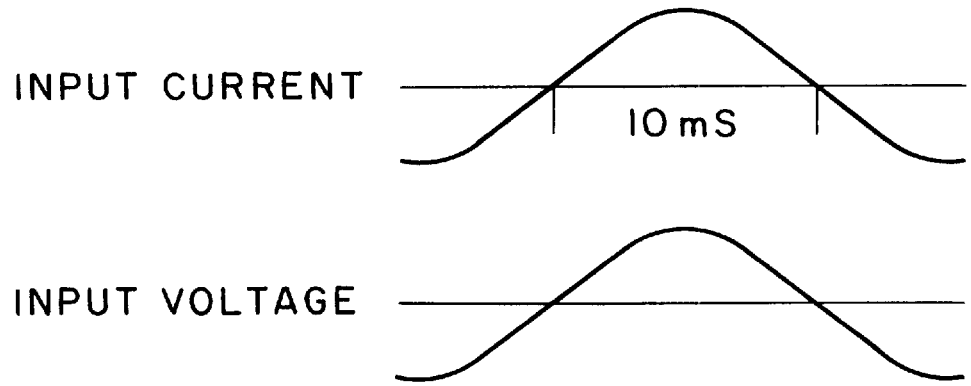
FIG. 24 is an enlarged waveform illustration of FIG. 21.

The waveforms of input current for the above devices are shown in FIGS. 19 through 24. FIG. 19 is a waveform illustration showing the input current waveform and the input voltage waveform of the discharge lamp lighting device shown in FIGS. 1 and 2; FIG. 22 is an enlarged waveform illustration of those shown in FIG. 19, FIG. 20 is a waveform illustration showing the input current waveform and the input voltage waveform of the discharge lamp lighting device shown in FIGS. 3 and 4; FIG. 23 is an enlarged waveform illustration of those shown in FIG. 20; FIG. 21 is a waveform illustration showing the input current waveform and the input voltage waveform of the discharge lamp lighting device of the first comparative example; and FIG. 24 is an enlarged waveform illustration of those shown in FIG. 21.

As shown in these results, the input currents of all the devices were virtually sine waves.

Figure 25:
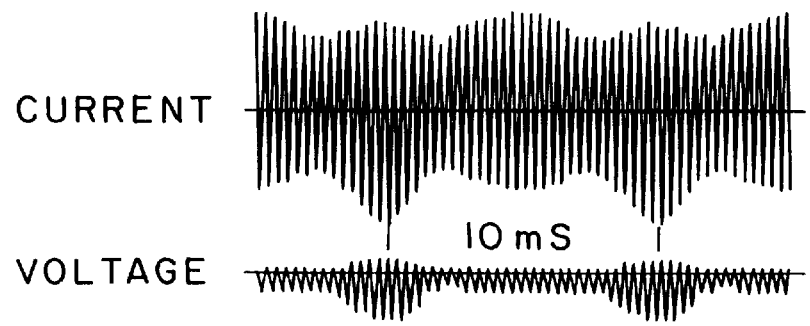
FIG. 25 is a waveform illustration showing the full cycle waveforms of the current and the voltage of a first auxiliary condenser C2 of the discharge lamp lighting device shown in FIGS. 1 and 2.
Figure 26:
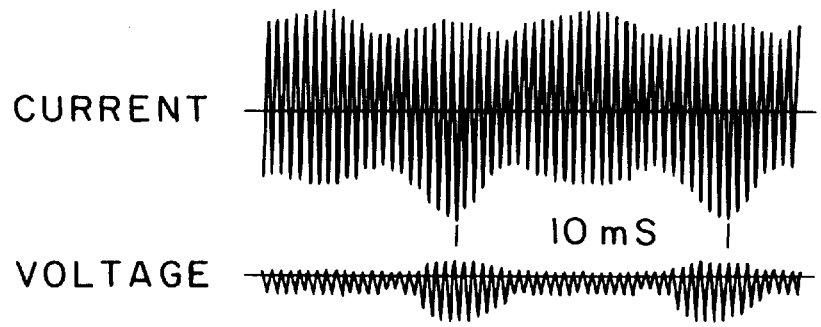
FIG. 26 is a waveform illustration showing the full cycle waveforms of the current and the voltage of a first auxiliary condenser C2 of the discharge lamp lighting device shown in FIGS. 3 and 4.
Figure 27:
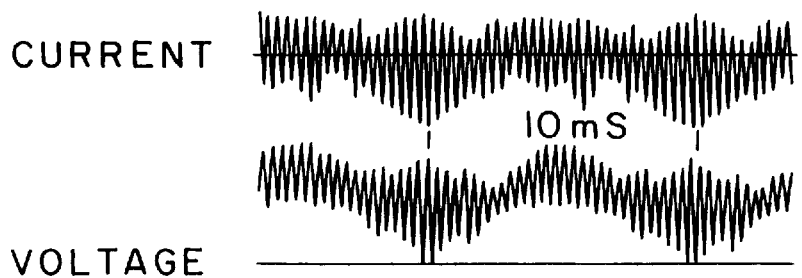
FIG. 27 is a waveform illustration showing the full cycle waveforms of the current and the voltage of a second condenser C6 of the discharge lamp lighting device of the first comparative example shown in FIGS. 11 and 12.
Figure 28:
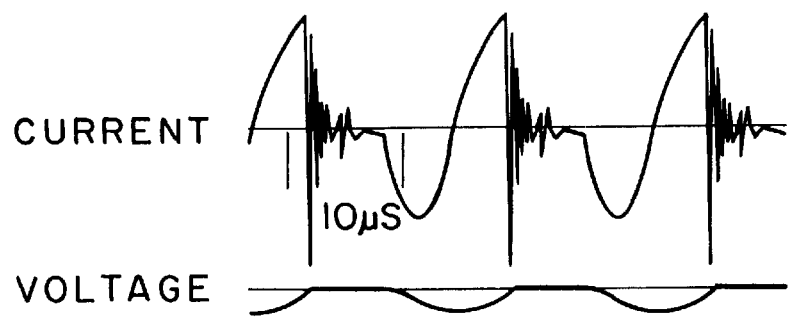
FIG. 28 is a waveform illustration showing the crests shown in FIG. 25.
Figure 29:
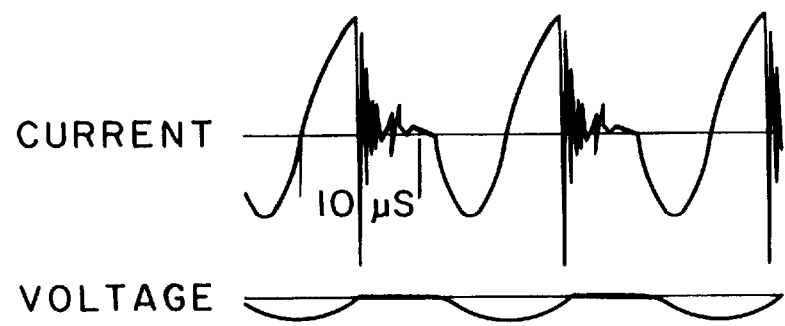
FIG. 29 is a waveform illustration showing the crests shown in FIG. 26.
Figure 30:
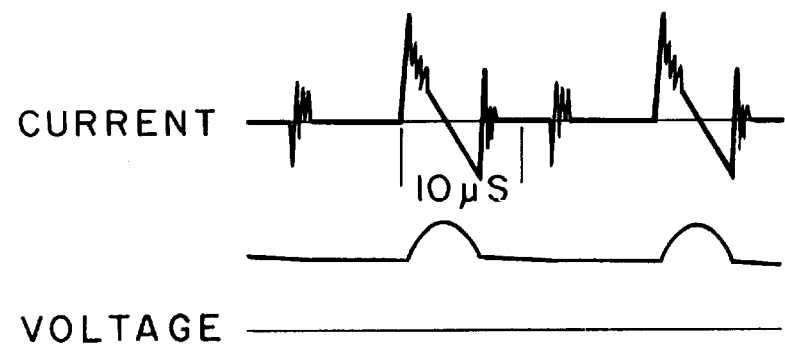
FIG. 30 is a waveform illustration showing the crests shown in FIG. 27.
Figure 31:
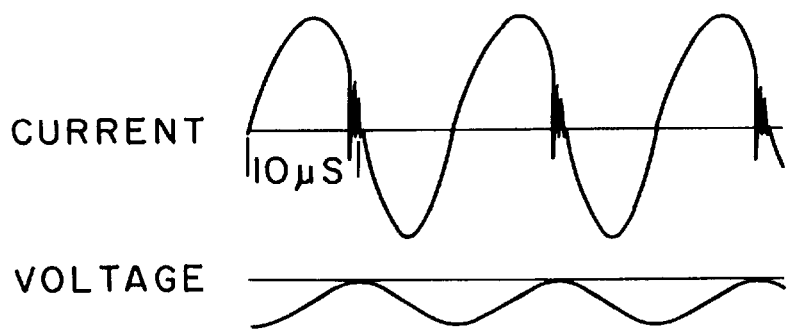
FIG. 31 is a waveform illustration showing the troughs shown in FIG. 25.
Figure 32:
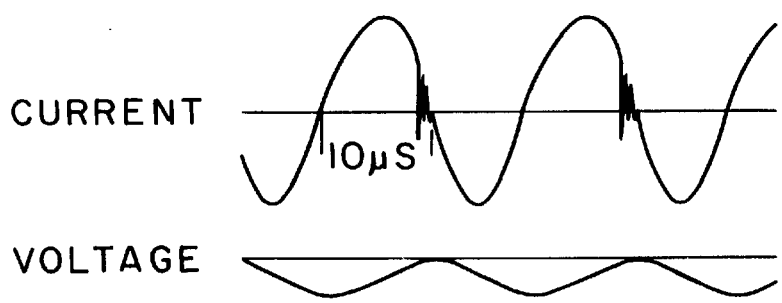
FIG. 32 is a waveform illustration showing the troughs shown in FIG. 26.
Figure 33:
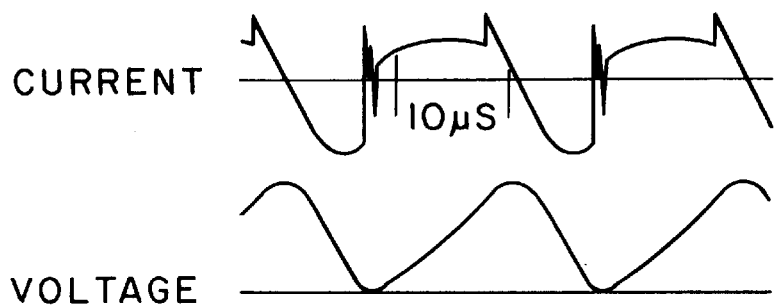
FIG. 33 is a waveform illustration showing the troughs shown in FIG. 27.

Next, current and voltage of first auxiliary condenser C2 of the discharge lamp lighting device shown in FIGS. 1 and 2, current and voltage of the first auxiliary condenser C2 of the discharge lamp lighting device shown in FIGS. 3 and 4, and current and voltage of second condenser C6 of the discharge lamp lighting device according to the first comparative example are explained, referring to FIGS. 25 through 36. FIG. 25 is a waveform illustration showing the full cycle waveforms of the current and the voltage of first auxiliary condenser C2 of the discharge lamp lighting device shown in FIGS. 1 and 2; FIG. 28 is a waveform illustration showing the crests shown in FIG. 25; FIG. 31 is a waveform illustration showing the troughs shown in FIG. 25; FIG. 34 is a waveform illustration for explaining the troughs shown in FIG. 25. FIG. 26 is a waveform illustration showing the full cycle waveforms of the current and the voltage of first auxiliary condenser C2 of the discharge lamp lighting device shown in FIGS. 3 and 4; FIG. 29 is a waveform illustration showing the crests shown in FIG. 26; FIG. 32 is a waveform illustration showing the troughs shown in FIG. 26; FIG. 35 is a waveform illustration for explaining the troughs shown in FIG. 26. FIG. 27 is a waveform illustration showing the full cycle waveforms of the current and the voltage of second condenser C6 of the discharge lamp lighting device of the first comparative example; FIG. 30 is a waveform illustration showing the crests shown in FIG. 27; FIG. 33 is a waveform illustration showing the troughs shown in FIG. 27; FIG. 36 is a waveform illustration for explaining the troughs shown in FIG. 27.

Figure 37:
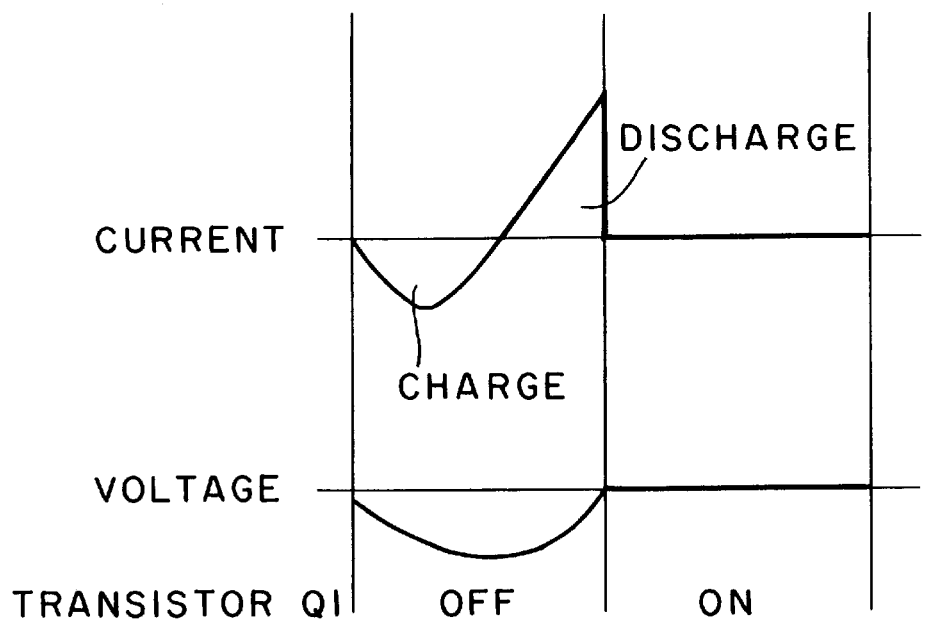
FIG. 37 is a waveform illustration showing the crest portions of current and voltage waves of the first auxiliary condenser C2 of the discharge lamp lighting device shown in FIGS. 1 and 2.
Figure 38:
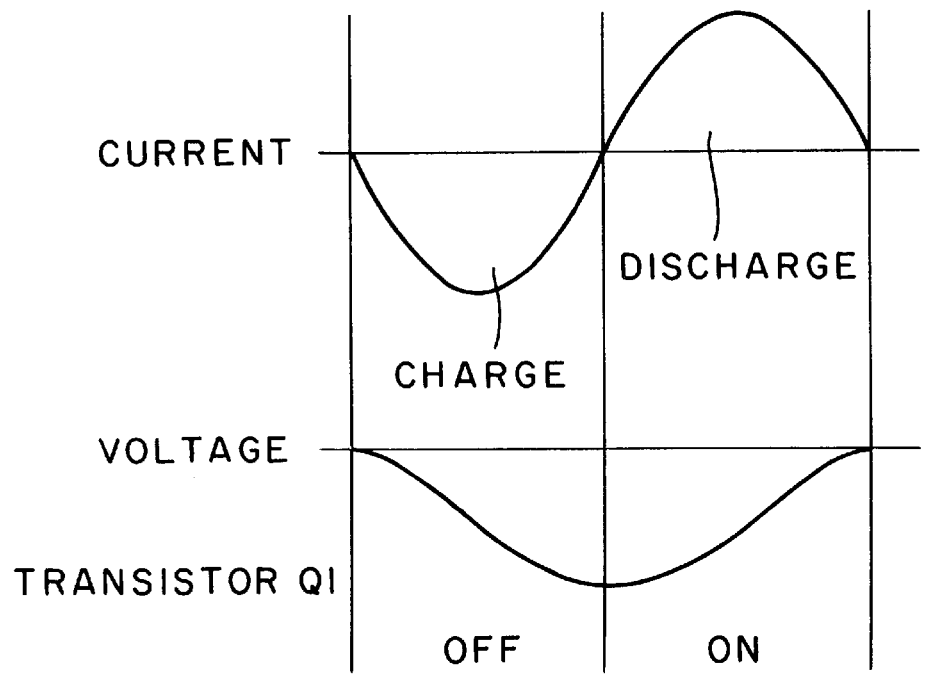
FIG. 38 is a waveform illustration showing the trough portions of current and voltage waves of the condenser in FIG. 37.
Figure 39:
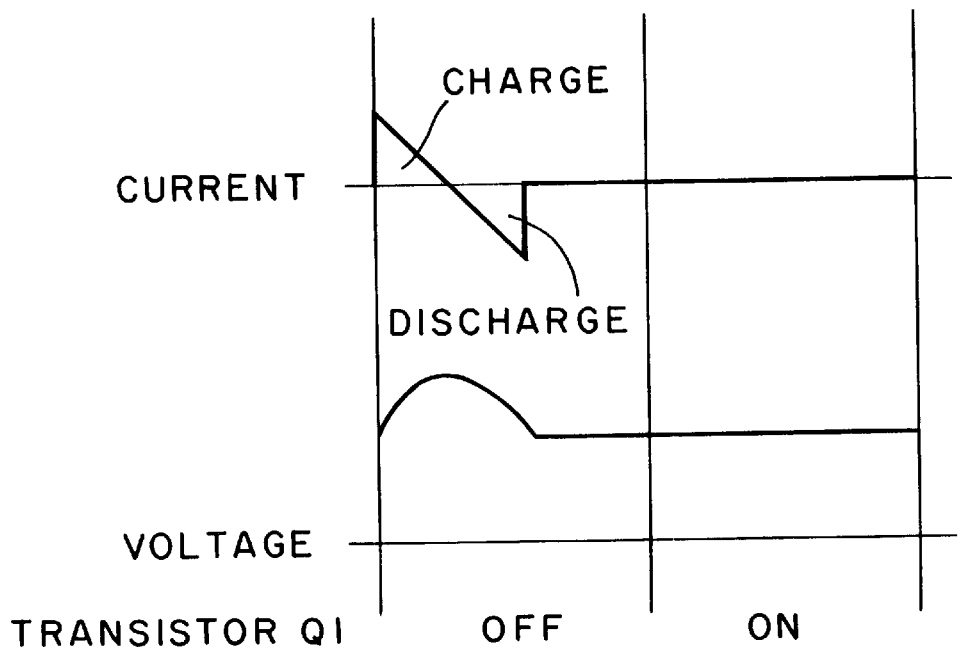
FIG. 39 is a waveform illustration showing the crest portions of current and voltage waves of a second condenser C6 of the discharge lamp lighting device according to the first comparative example.
Figure 40:
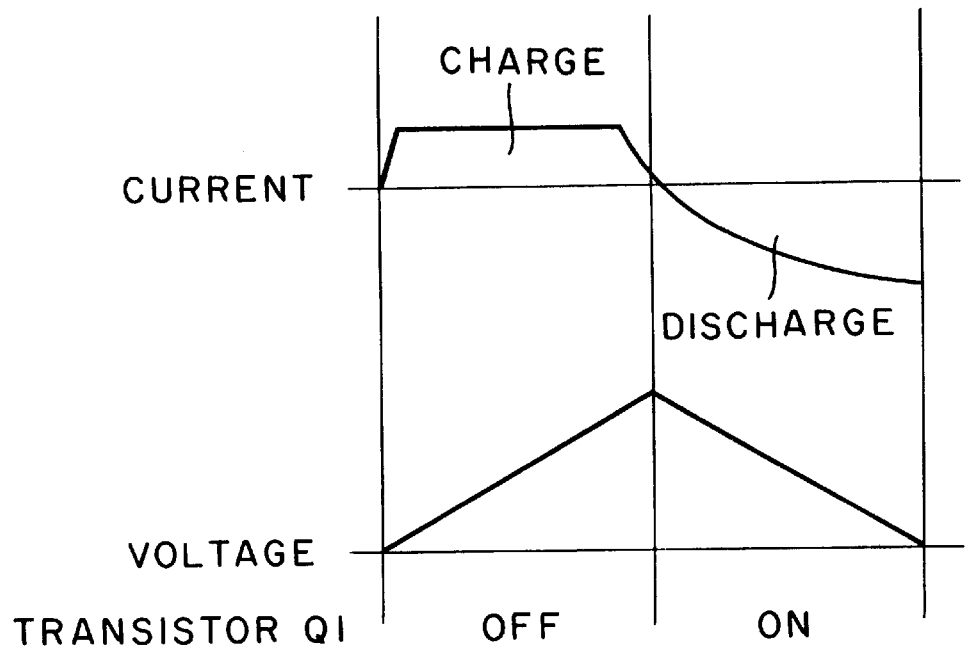
FIG. 40 is a waveform illustration showing the trough portions of current and voltage waves of the condenser in FIG. 34.
Figure 41:
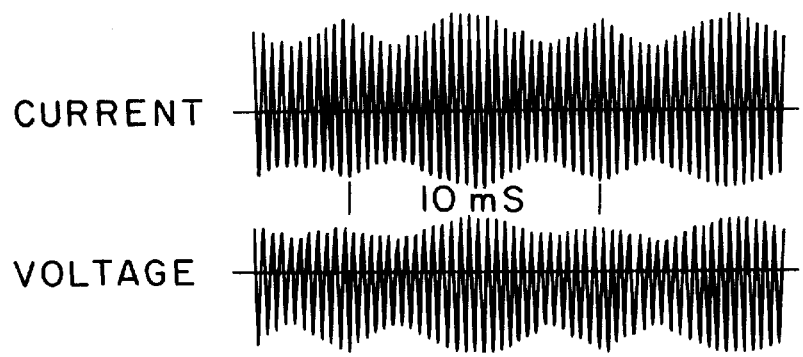
FIG. 41 is a waveform illustration showing the full cycle waveforms of the current and the voltage of a primary winding Tr1a of an inverter transformer Tr1 of the discharge lamp lighting device shown in FIGS. 1 and 2.

Further, the discharge lamp lighting device shown in FIGS. 1 and 2 and the discharge lamp lighting device according to the first comparative example are explained in concrete terms, referring to FIGS. 37 through 40. FIG. 37 is a waveform illustration showing the crest portions of current and voltage waves of first auxiliary condenser C2 of the discharge lamp lighting device shown in FIGS. 1 and 2; FIG. 38 is a waveform illustration showing the trough portions of current and voltage waves of the same. FIG. 39 is a waveform illustration showing the crest portions of current and voltage waves of second condenser C6 of the discharge lamp lighting device according to the first comparative example; and FIG. 40 is a waveform illustration showing the trough portions of current and voltage waves of the same.

For the discharge lamp lighting device of FIGS. 1 and 2, as the parallel resonance of forced oscillation is strengthened at the crest portions shown in FIG. 37, the circuit efficiency is increased during the forced oscillation, and the unbalance of the lamp current is eliminated. In addition, as the device forces the resonance, bypassing transistor Q1, the crest factor is improved, and, therefore, the voltage and the current of transistor Q1 can be reduced. At the trough portions shown in FIG. 38, also, a current having a nearly sinusoidal waveform is obtained because of the presence of energy with high frequency oscillation of diode D5 and first auxiliary condenser C2.

In contrast to the above, in the discharge lamp lighting device according to the first comparative example, second condenser C6 has little functionality at the crest portions shown in FIG. 39, because second condenser C6 is located outside the closed path of parallel resonance circuit 5. At the trough portions shown in FIG. 40, also, the device is unable to form a sinusoidal waveform, because choke coil L1 makes the charging action virtually a constant-current charge.

The actual results of the measurements for the device shown in FIGS. 1 and 2 show a current of 2.0A with an "on" cycle of 52.6% and a voltage of 400 V with an "on" cycle of 52.6% at the trough portions when transistor Q1 is in the "on" state. The device of FIGS. 3 and 4 showed a current of 1.8A with an "on" cycle of 51.3% and a voltage of 300 V with an "on" cycle of 51.3% at the trough portions when transistor Q1 is in the "on" state. The comparative example shows a current of 1.6A with an "on" cycle of 38.6% and a voltage of 400 V with an "on" cycle of 38.6% at the trough portions when transistor Q1 is in the "on" state.

It has been found from the above results, that the discharge lamp lighting device shown in FIGS. 1 and 2 is capable of providing an effective current 1.7 times greater than that of the first comparative example, because:

$$(2.0 \times 52.6)/(1.6 \times 38.6) = 1.7.$$

Although the maximum voltage is the same as that of the first comparative example, i. e. 400 V, the effective voltage is 1.36 times greater than that of the first comparative example, because:

$$(400 \times 52.6)/(400 \times 38.6) = 1.36.$$

The discharge lamp lighting device shown in FIGS. 3 and 4 is capable of providing an effective current 1.5 times greater than that of the first comparative example, because:

$$(1.8 \times 51.3)/(1.6 \times 38.6) = 1.50.$$

With the maximum voltage reduced from 400 V to 300 V, the effective voltage is 1.00 times as large as that of the first comparative example, because:

(300×51.3)/(400×38.6)=1.00.

The current value of the discharge lamp lighting device shown in FIGS. 3 and 4 is lower than that of the discharge lamp lighting device shown in FIGS. 1 and 2, because the former device includes second condenser C6.

As described above, the "on" efficiency of transistor Q1 at the trough portions, in other words, the energy inflow efficiency of forced oscillation at the trough portions, is increased.

Figure 42:
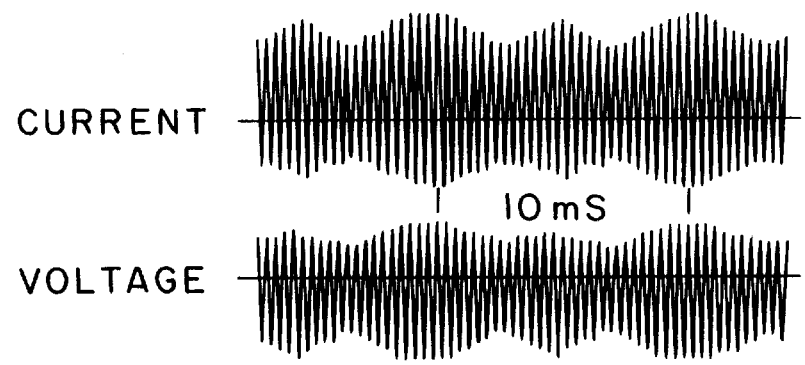
FIG. 42 is a waveform illustration showing the full cycle waveforms of the current and the voltage of a primary winding Tr1a of an inverter transformer Tr1 of the discharge lamp lighting device shown in FIGS. 3 and 4.
Figure 43:
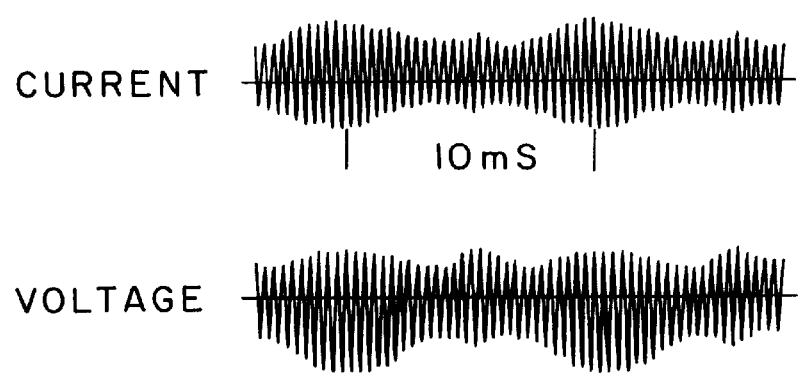
FIG. 43 is a waveform illustration showing the full cycle waveforms of the current and the voltage of a primary winding Tr1a of an inverter transformer Tr1 of the discharge lamp lighting device according to the first comparative example shown in FIGS. 11 and 12.
Figure 44:
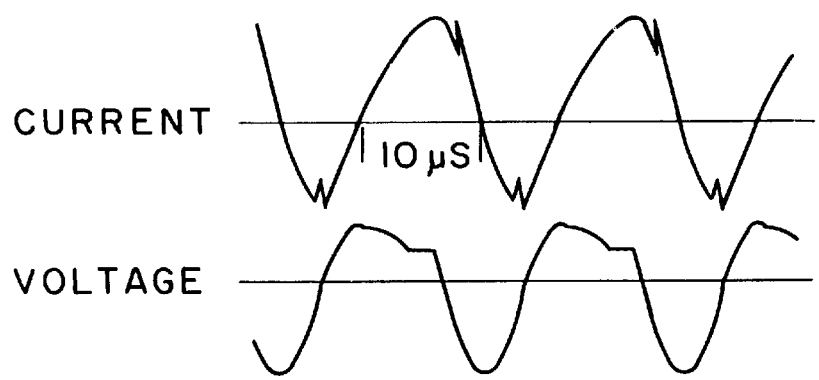
FIG. 44 is a waveform illustration showing the crests shown in FIG. 41.
Figure 45:
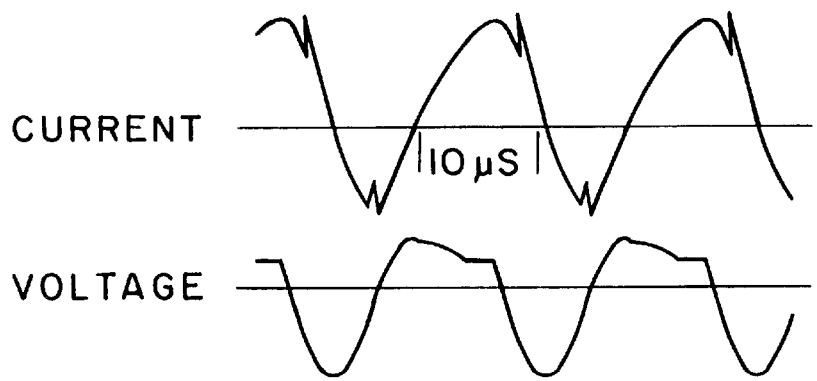
FIG. 45 is a waveform illustration showing the crests shown in FIG. 42.
Figure 46:
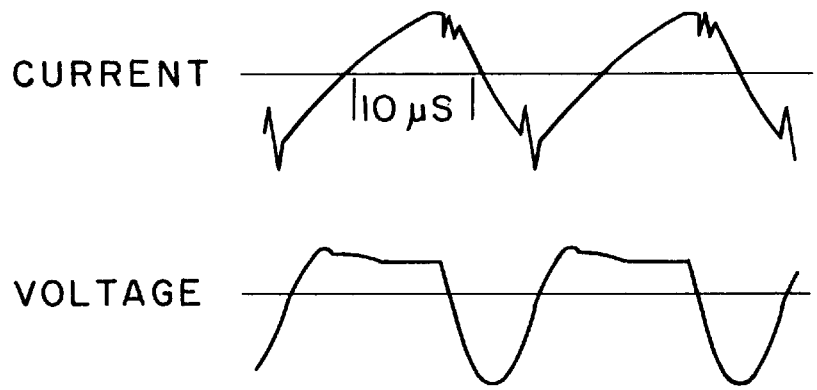
FIG. 46 is a waveform illustration showing the crests shown in FIG. 43.
Figure 47:
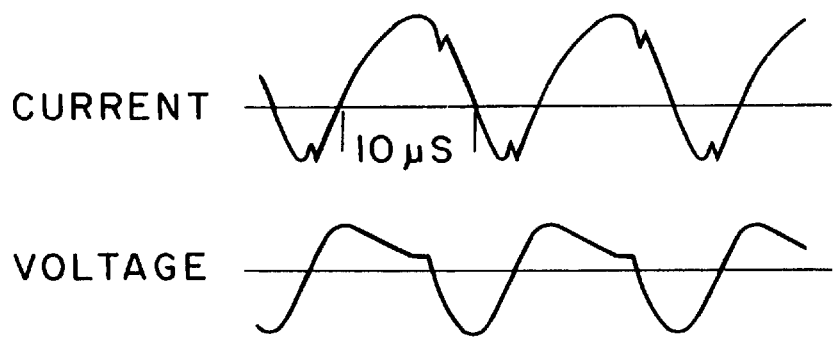
FIG. 47 is a waveform illustration showing the troughs shown in FIG. 41.
Figure 48:
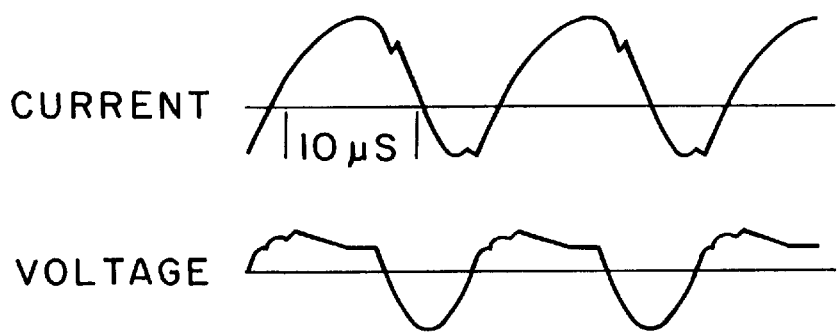
FIG. 48 is a waveform illustration showing the troughs shown in FIG. 42.
Figure 49:
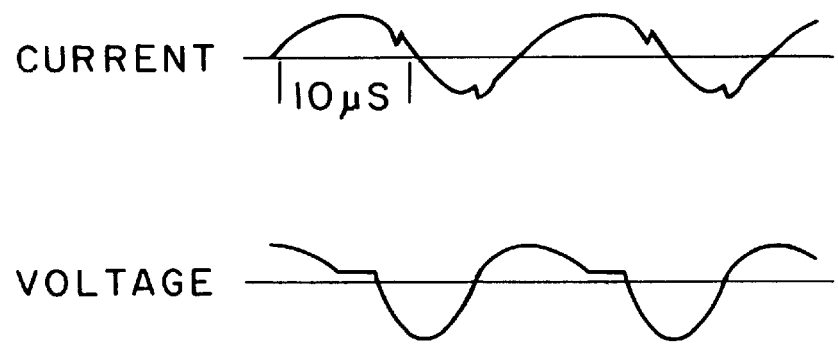
FIG. 49 is a waveform illustration showing the troughs shown in FIG. 43.
Figure 50:
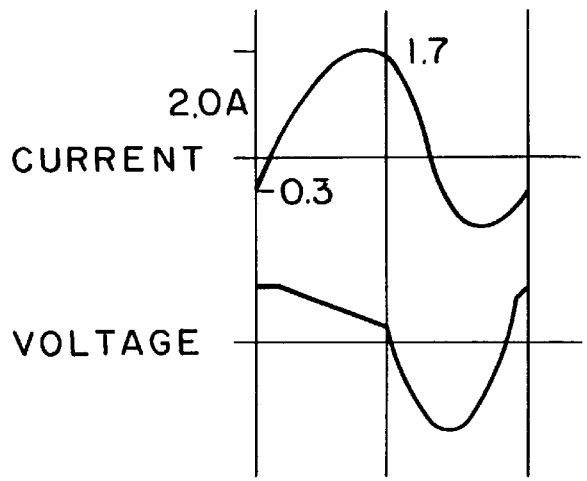
FIG. 50 is a waveform illustration for explaining the troughs shown in FIG. 41.
Figure 51:
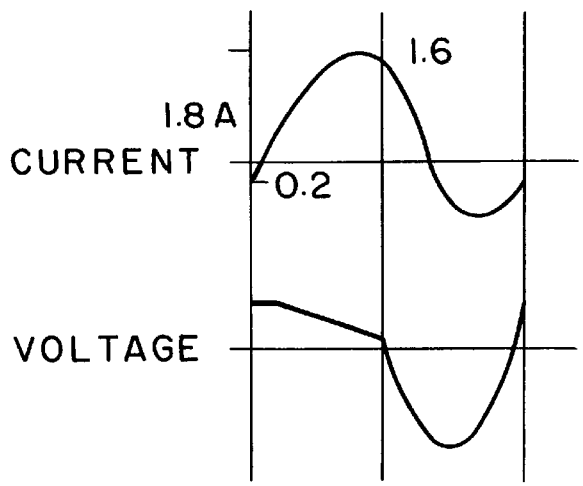
FIG. 51 is a waveform illustration for explaining the troughs shown in FIG. 42.
Figure 52:
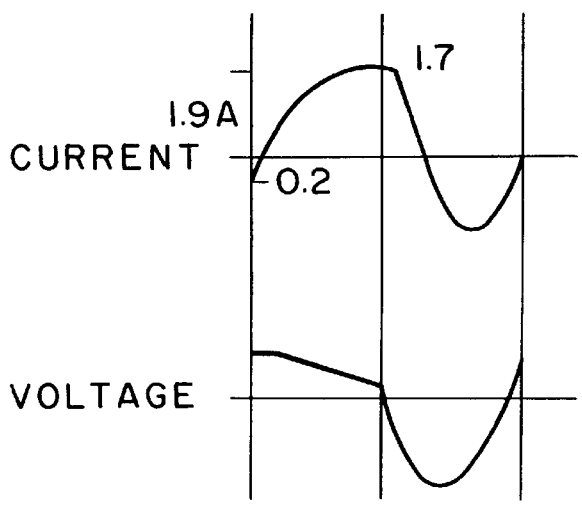
FIG. 52 is a waveform illustration for explaining the troughs shown in FIG. 43.
Figure 53:
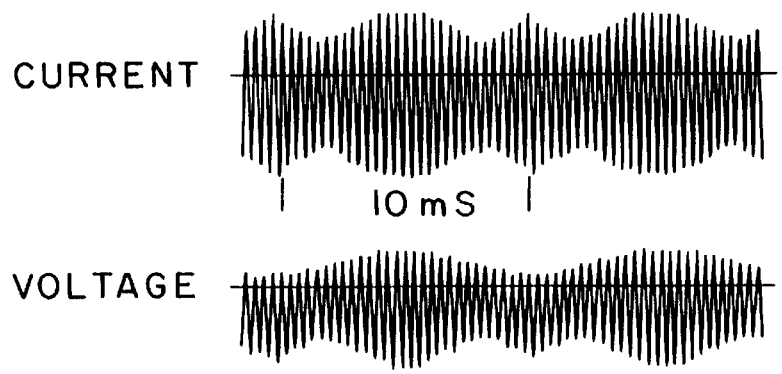
FIG. 53 is a waveform illustration showing the full cycle waveform of the current and the voltage of a main condenser C3 of the discharge lamp lighting device shown in FIGS. 1 and 2.

Next, an explanation is given regarding the current and voltage of primary winding Tr1a of inverter transformer Tr1 of the discharge lamp lighting device shown in FIGS. 1 and 2, FIGS. 3 and 4, and according to the first comparative example. Referring to FIGS. 41 through 52, FIG. 41 is a waveform illustration showing the full cycle waveforms of the current and the voltage of primary winding Tr1a of invertor transformer Tr1 of the discharge lamp lighting device shown in FIGS. 1 and 2; FIG. 44 is a waveform illustration showing the crest portions shown in FIG. 41; FIG. 47 is a waveform illustration showing the trough portions shown in FIG. 41; FIG. 50 is a waveform illustration for explaining the trough portions shown in FIG. 41. FIG. 42 is a waveform illustration showing the full cycle waveforms of the current and the voltage of primary winding Tr1a of inverter transformer Tr1 of the discharge lamp lighting device shown in FIGS. 3 and 4; FIG. 45 is a waveform illustration showing the crest portions show in FIG. 42; FIG. 48 is a waveform illustration showing the trough portions shown in FIG. 42; FIG. 51 is a waveform illustration for explaining the trough portions shown in FIG. 42. FIG. 43 is a waveform illustration showing the full cycle waveforms of the current and the voltage of primary winding Tr1a of inverter transformer Tr1 of the discharge lamp lighting device according to the first comparative example; FIG. 46 is a waveform illustration showing the crest portions shown in FIG. 43; FIG. 49 is a waveform illustration showing the trough portions shown in FIG. 43; and FIG. 52 is a waveform illustration for explaining the trough portions shown in FIG. 43.

As shown in these waveform illustrations, both discharge lamp lighting devices shown in FIGS. 1 and 2 and FIGS. 3 and 4 are designed so that their parallel resonance is strengthened at the trough portions and made virtually flat throughout the entire cycle. However, the parallel resonance of the first comparative example is not flat.

The reason is, as follows: both in the discharge lamp lighting device shown in FIGS. 1 and 2 and shown in FIGS. 3 and 4, first condenser C1 and first auxiliary condenser C2 are connected in series so that high frequency energy generated on first auxiliary condenser C2 serves as the current flowing through primary winding Tr1a. In the first comparative example, however, the current of primary winding Tr1a consists of the current of first condenser C1 and the current of second condenser C6, on which high frequency oscillation is generated.

Figure 54:
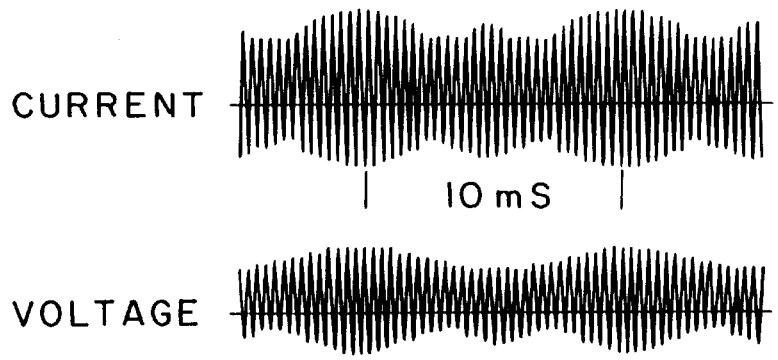
FIG. 54 is a waveform illustration showing the full cycle waveforms of the current and the voltage of a main condenser C3 of the discharge lamp lighting device shown in FIGS. 3 and 4.
Figure 55:
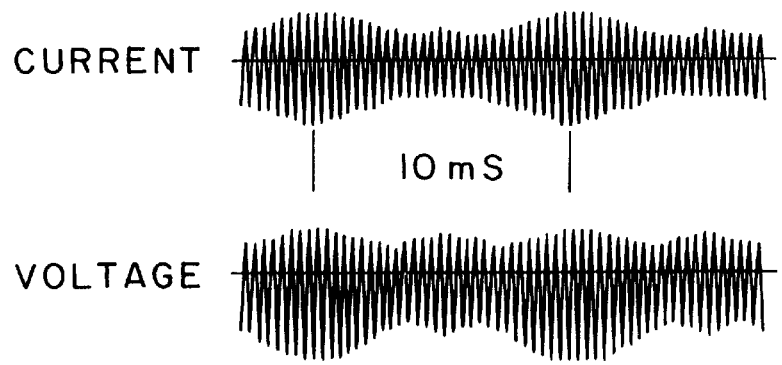
FIG. 55 is a waveform illustration showing the full cycle waveforms of the current and the voltage of a main condenser C3 of the discharge lamp lighting device according to the first comparative example shown in FIGS. 11 and 12.
Figure 56:
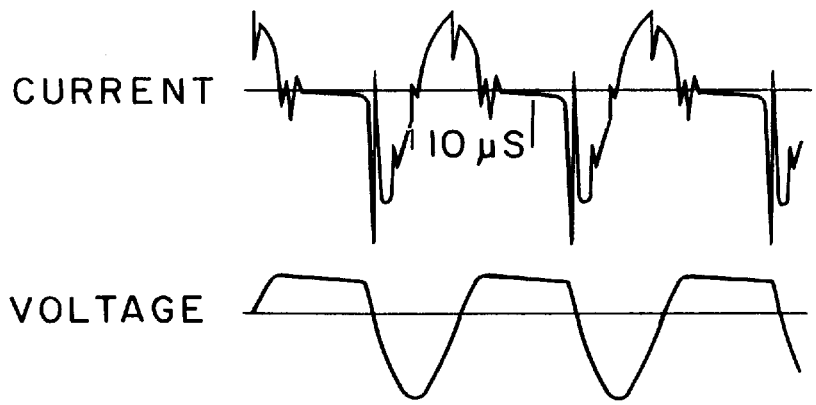
FIG. 56 is a waveform illustration showing the crests shown in FIG. 53.
Figure 57:
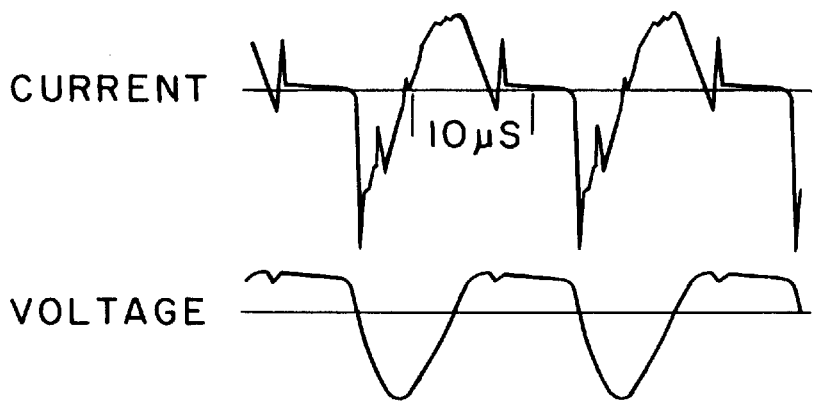
FIG. 57 is a waveform illustration showing the crests shown in FIG. 54.
Figure 58:
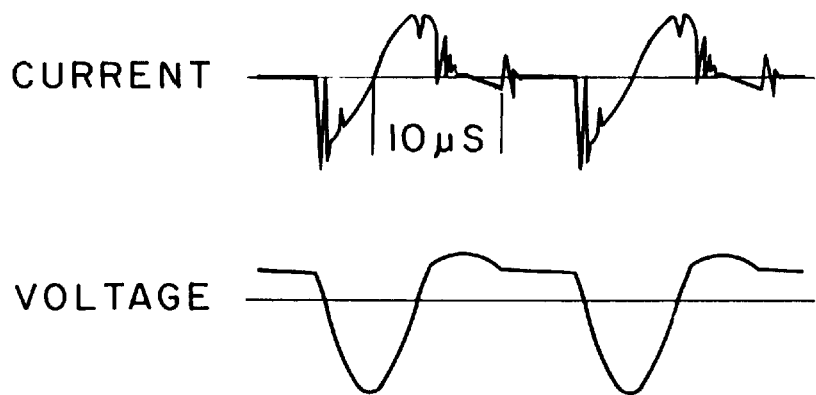
FIG. 58 is a waveform illustration showing the crests shown in FIG. 55.
Figure 59:
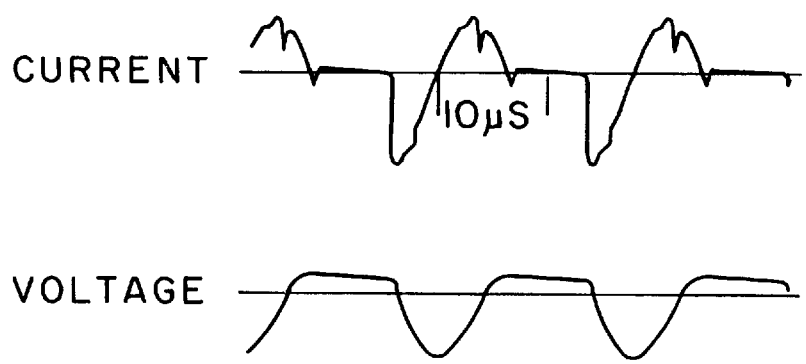
FIG. 59 is a waveform illustration showing the troughs shown in FIG. 53.
Figure 60:
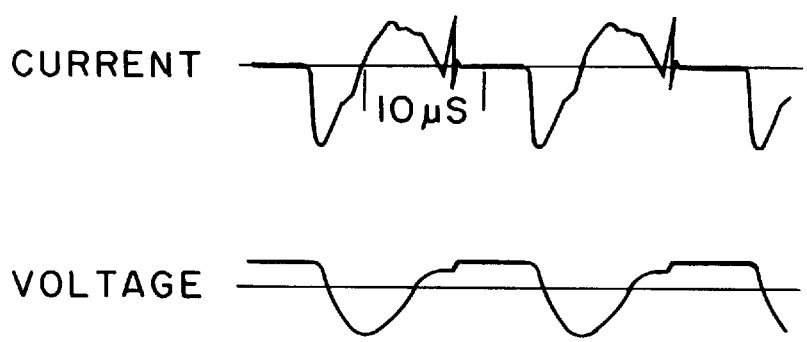
FIG. 60 is a waveform illustration showing the troughs shown in FIG. 54.
Figure 61:
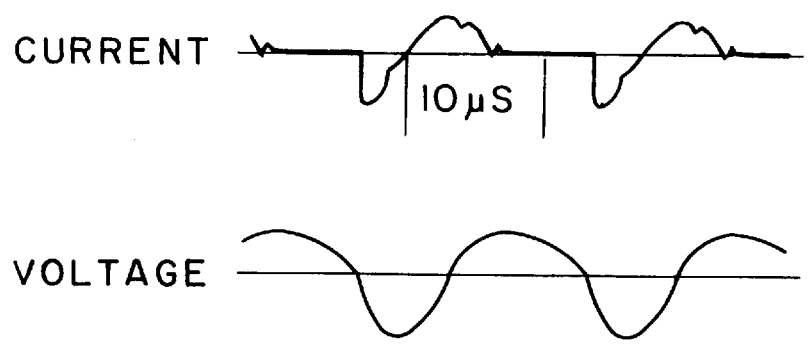
FIG. 61 is a waveform illustration showing the troughs shown in FIG. 55.
Figure 62:
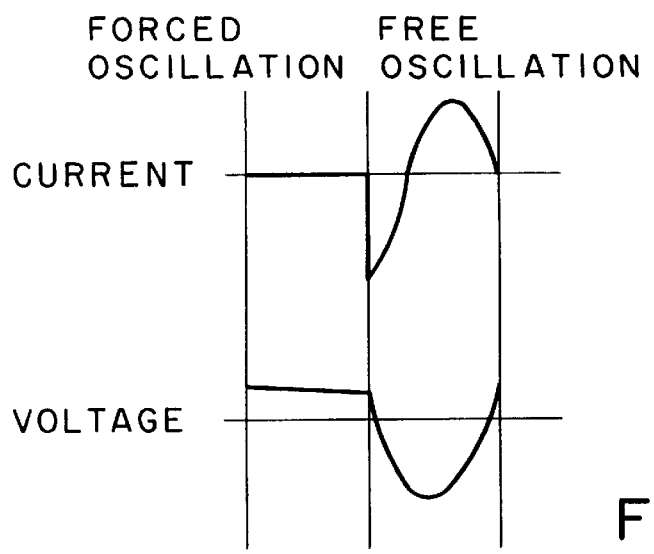
FIG. 62 is a waveform illustration for explaining the troughs shown in FIG. 53.
Figure 63:
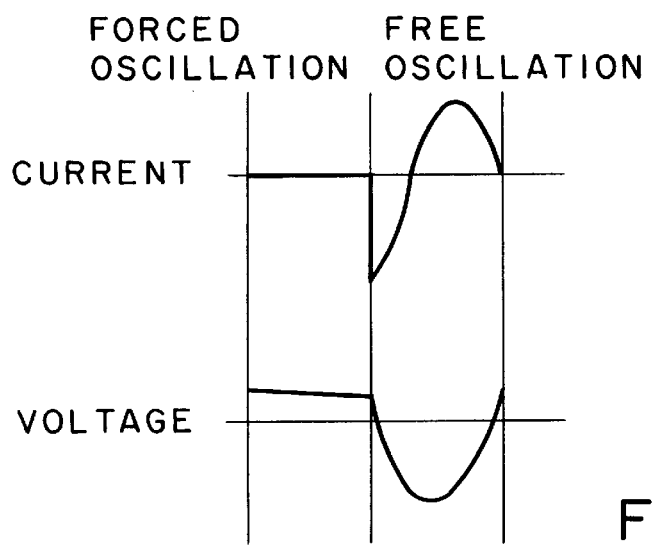
FIG. 63 is a waveform illustration for explaining the troughs shown in FIG. 54.
Figure 64:
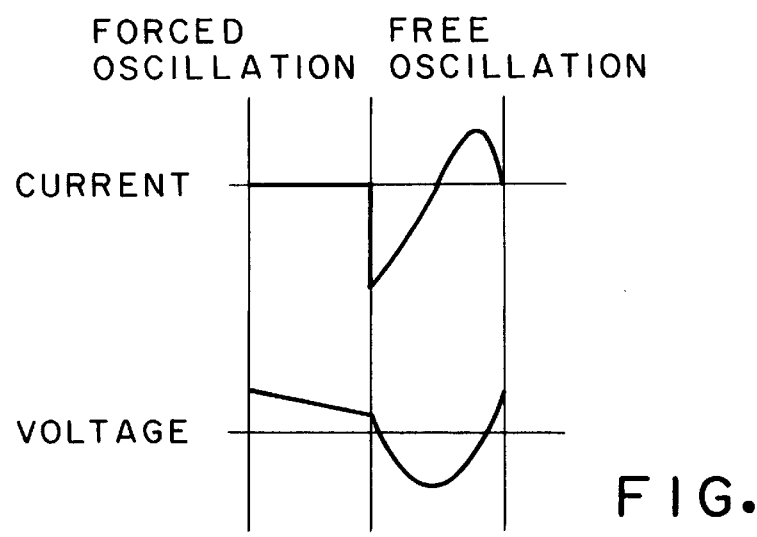
FIG. 64 is a waveform illustration for explaining the troughs shown in FIG. 55.

Next, an explanation is given regarding the current and voltage of main condenser C3 of the discharge lamp lighting device shown in FIGS. 1 and 2, in FIGS. 3 and 4, and in the first comparative example. Referring to FIGS. 53 through 64, FIG. 53 is a waveform illustration showing the full cycle waveforms of the current and the voltage of main condenser C3 of the discharge lamp lighting device shown in FIGS. 1 and 2; FIG. 56 is a waveform illustration showing the crest portions shown in FIG. 53; FIG. 59 is a waveform illustration showing the trough portions shown in FIG. 53; FIG. 62 is a waveform illustration for explaining the trough portions shown in FIG. 53. FIG. 54 is a waveform illustration showing the full cycle waveforms of the current and the voltage of main condenser C3 of the discharge lamp lighting device shown in FIGS. 3 and 4; FIG. 57 is a waveform illustration showing the crest portions shown in FIG. 54; FIG. 60 is a waveform illustration showing the trough portions shown in FIG. 54; FIG. 63 is a waveform illustration for explaining the trough portions shown in FIG. 54 . FIG. 55 is a waveform illustration showing the full cycle waveforms of the current and the voltage of main condenser C3 of the discharge lamp lighting device according to the first comparative example; FIG. 58 is a waveform illustration showing the crest portions shown in FIG. 55; FIG. 61 is a waveform illustration showing the trough portions shown in FIG. 55; and FIG. 64 is a waveform illustration for explaining the trough portions shown in FIG. 55.

As shown in those waveform illustrations, both discharge lamp lighting devices shown in FIGS. 1 and 2 and FIGS. 3 and 4 are designed so that no current flows during the forced oscillation at the trough portions. Thus, compared with the first comparative example, their parallel resonance current flowing into main condenser C3 during the free oscillation is strengthened and made virtually flat throughout the entire cycle.

Next, an explanation is given regarding high frequency oscillation, referring to FIGS. 65 through 68.

Figure 65:
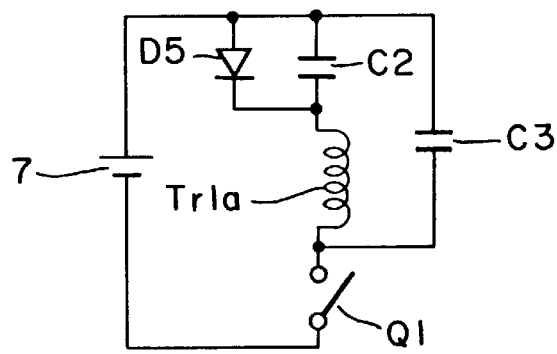
FIG. 65 is a simplified equivalent circuit diagram of the discharge lamp lighting device shown in FIGS. 1 and 2.
Figure 67:
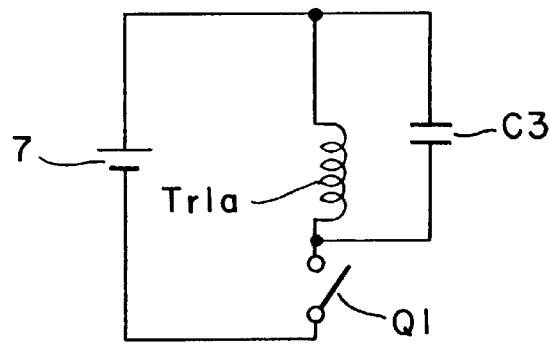
FIG. 67 is a simplified equivalent circuit diagram of the discharge lamp lighting device according to the first comparative example shown in FIGS. 11 and 12.

The partial smoothing circuit is omitted in FIG. 65 and FIG. 67. As shown in the simplified equivalent circuit of FIG. 67, in the discharge lamp lighting device according to the first comparative example, current flows along the path from primary winding Tr1a through the main condenser C3 and back to the primary winding Tr1a when the transistor Q1 is off, thereby causing a discharge from the primary winding Tr1a and charging the main condenser C3.

However, as shown in the simplified equivalent circuit of FIG. 65, the discharge lamp lighting device shown in FIGS. 1 and 2 allows current flow along the path from primary winding Tr1a through main condenser C3 to diode D5 and then back to primary winding Tr1a when transistor Q1 is off, thereby causing a discharge from primary winding Tr1a and charging main condenser C3 while first auxiliary condenser C2 is gradually charged.

As the discharge from first auxiliary condenser C2 starts after the discharge from the primary winding Tr1a ends, the time constant of the free oscillation is increased. Therefore, the discharge lamp lighting device shown in FIGS. 1 and 2 is capable of restraining back electromotive force and reducing the rate of current change, thereby reducing the collector-emitter voltage of transistor Q1, and reducing the degree of unbalance of the lamp current.

Figure 66:
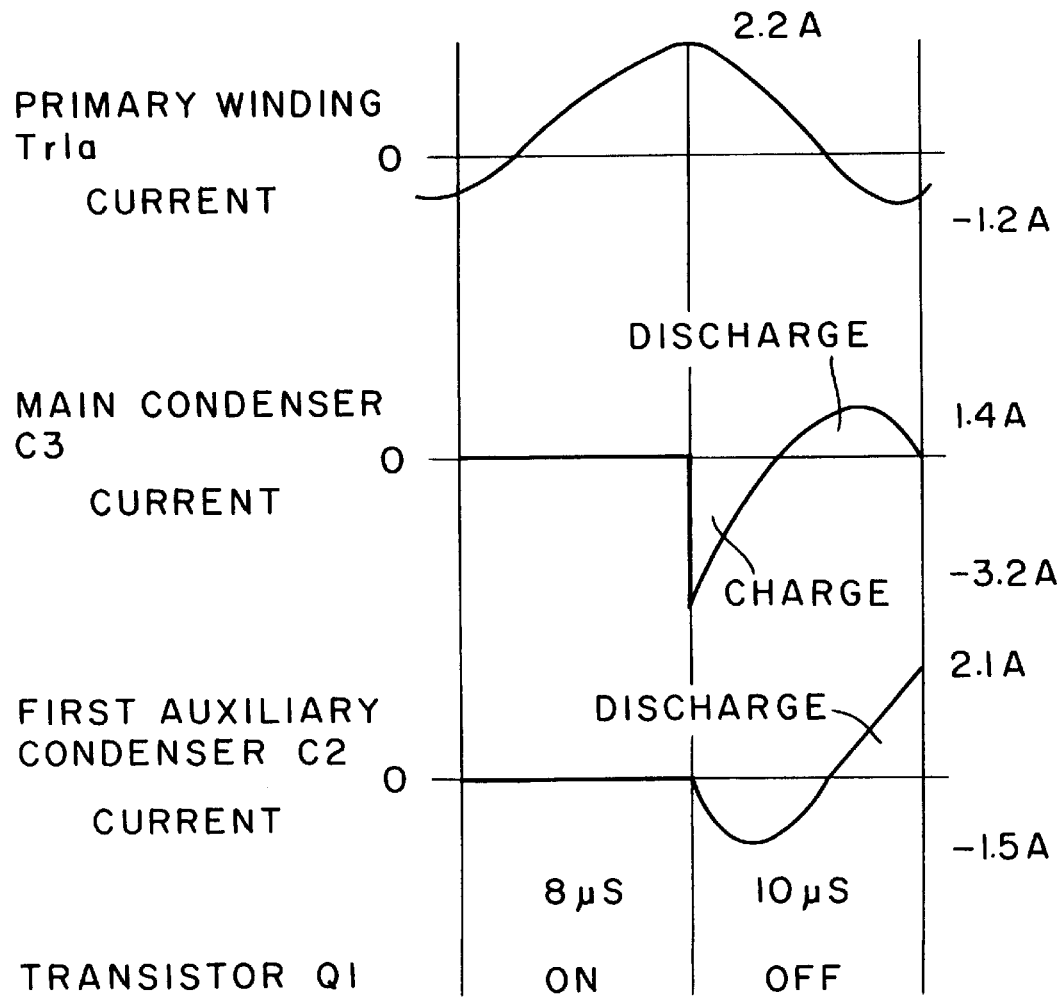
FIG. 66 is a waveform illustration showing current waveforms of the primary winding Tr1a, the main condenser C3 and the first auxiliary condenser C2 of the circuit shown in FIG. 65.
Figure 68:
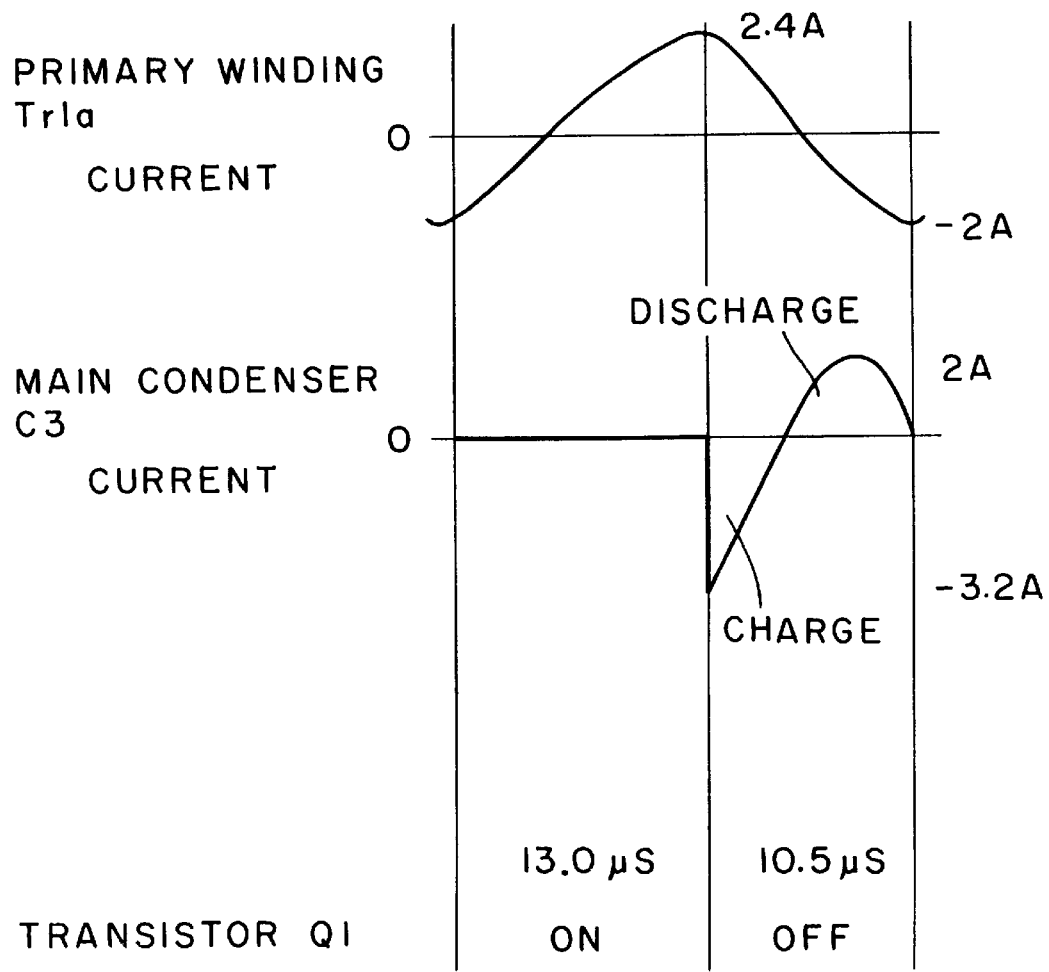
FIG. 68 is a waveform illustration showing current waveforms of the primary winding Tr1a and the main condenser C3 of the circuit shown in FIG. 67.

It is evident from comparing FIGS. 66 and 68 that the comparative example presents the off-duty period of 44.7 %, while the discharge lamp lighting device shown in FIGS. 1 and 2 presents the off-duty period of 55.5 %.

In addition, as the discharge lamp lighting device shown in FIGS. 1 and 2 performs free oscillation, bypassing transistor Q1 when transistor Q1 is in the off state. The device is capable of reducing the current of the collector of the transistor Q1 to 2.5A, in other words 80.6 % of that of the first comparative example, i. e. 3.1A.

Figure 69:
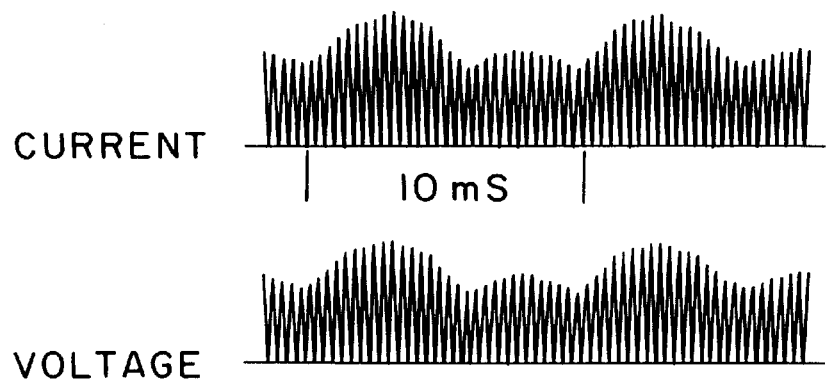
FIG. 69 is a waveform illustration showing the full cycle waveforms of the current and the voltage of a transistor Q1 (through and across the collector-emitter) of the discharge lamp lighting device shown in FIGS. 1 and 2.
Figure 70:
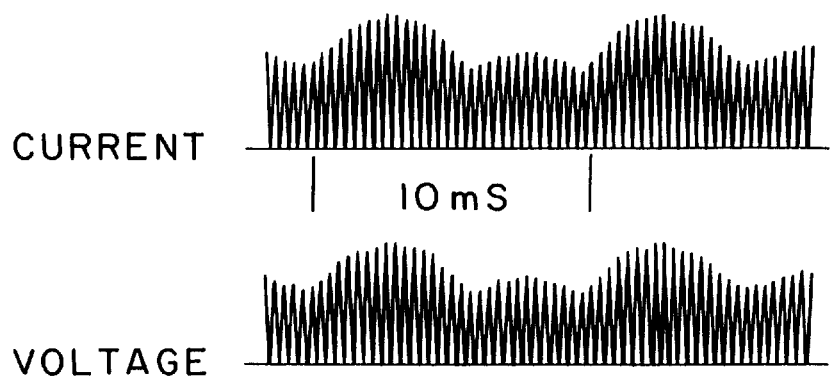
FIG. 70 is a waveform illustration showing the full cycle waveforms of the current and the voltage of a transistor Q1 of the discharge lamp lighting device shown in FIGS. 3 and 4.
Figure 71:
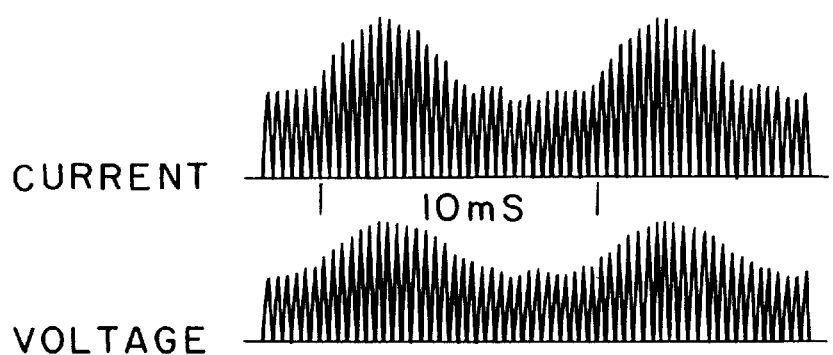
FIG. 71 is a waveform illustration showing the full cycle waveforms of the current and the voltage of a transistor Q1 of the discharge lamp lighting device according to the first comparative example shown in FIGS. 11 and 12.
Figure 78:
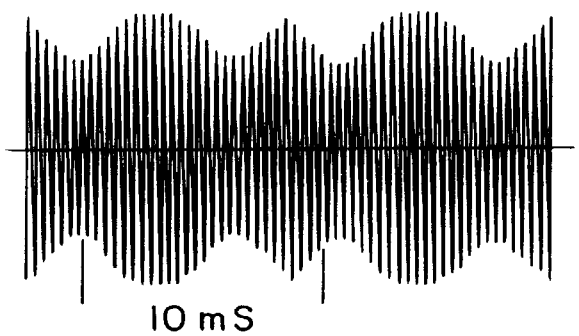
FIG. 78 is a waveform illustration showing the full cycle waveforms of the current of a lamp of the discharge lamp lighting device shown in FIGS. 1 and 2.

Next, an explanation is given regarding voltage and current of transistor Q1 (across and through the collector-emitter) of the discharge lamp lighting device shown in FIGS. 1 and 2, FIGS. 3 and 4, and according to the first comparative example. Referring to FIGS. 69 through 77, FIG. 69 is a waveform illustration shoving the full cycle waveforms of the current and the voltage of transistor Q1 of the discharge lamp lighting device shown in FIGS. 1 and 2;

FIG. 72 is a waveform illustration showing the crest portions shown in FIG. 69; FIG. 75 is a waveform illustration showing the trough portions shown in FIG. 69. FIG. 70 is a waveform illustration showing the full circle waveforms of the current and the voltage of transistor Q1 of the discharge lamp lighting device shown in FIGS. 3 and 4; FIG. 73 is a waveform illustration showing the crest portions shown in FIG. 70; FIG. 76 is a waveform illustration showing the trough portions shown in FIG. 70. FIG. 71 is a waveform illustration showing the full cycle waveforms of the current and the voltage of transistor Q1 of the discharge lamp lighting device according to the first comparative example; FIG. 74 is a waveform illustration showing the crest portions shown in FIG. 71; and FIG. 77 is a waveform illustration showing the trough portions shown in FIG. 71.

Specific numerical values are as shown in Table 2 below:

TABLE 2

|   | Max. Conducted Current | Max. Applied Voltage |
|---|---|---|
| A | 2.5 | 1120 |
| B | 2.6 | 1080 |
| C | 3.1 | 1180 | where:
A: the discharge lamp lighting device shown in FIGS. 1 and 2
B: the discharge lamp lighting device shown in FIGS. 3 and
C: the discharge lamp lighting device according to the first comparison example.

As is evident from the above results, both the maximum conducted current and the maximum-applied voltage of the discharge lamp lighting device shown in FIGS. 1 and 2 and the discharge lamp lighting device shown in FIGS. 3 and 4 are lower than those of the first comparative example. According to the configurations of the discharge lamp lighting device shown in FIGS. 1 and 2 and the discharge lamp lighting device shown in FIGS. 3 and 4, the current is set nearly flat throughout the entire cycle. Therefore, in cases where the effective outputs of the discharge lamp lighting devices shown in FIGS. 1 and 2 and FIGS. 3 and 4 are set at the same level as the device according to the comparative example, the current value is reduced at the crest portions, and the efficiencies of the devices are therefore improved.

Figure 79:
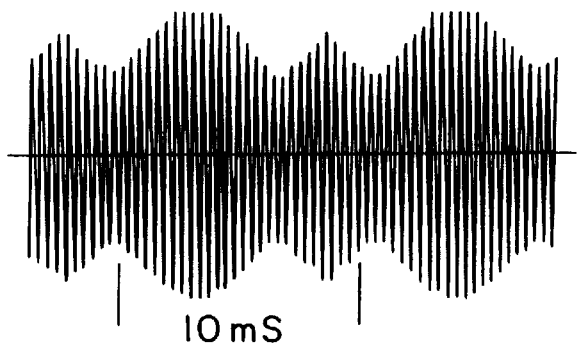
FIG. 79 is a waveform illustration showing the full cycle waveforms of the current of a lamp of the discharge lamp lighting device shown in FIGS. 3 and 4.
Figure 80:
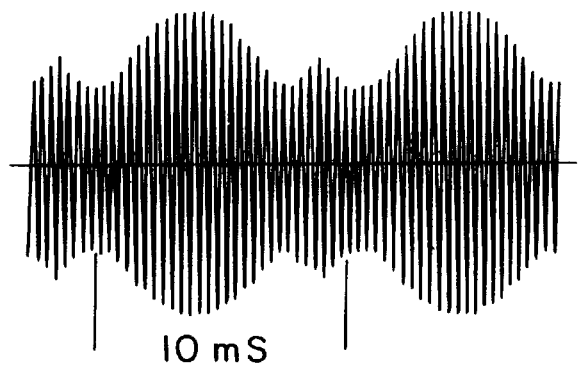
FIG. 80 is a waveform illustration showing the full cycle waveforms of the current of a lamp of the discharge lamp lighting device according to the first comparative example shown in FIGS. 11 and 12.
Figure 81:
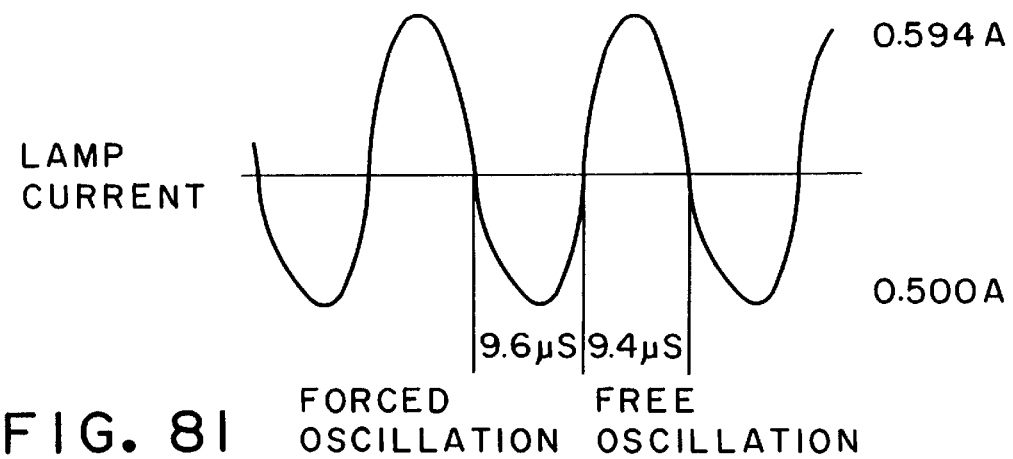
FIG. 81 is a waveform illustration showing the crests shown in FIG. 78.
Figure 82:
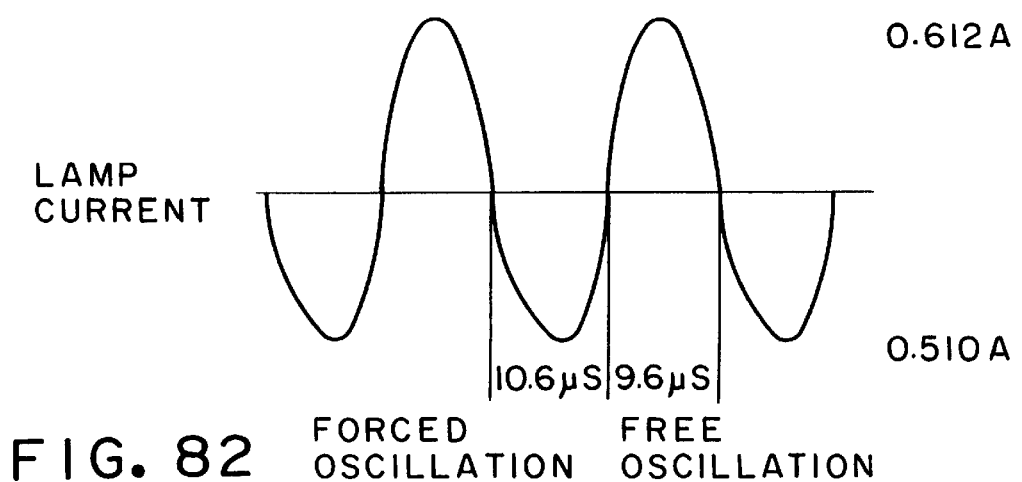
FIG. 82 is a waveform illustration showing the crests shown in FIG. 79.
Figure 83:
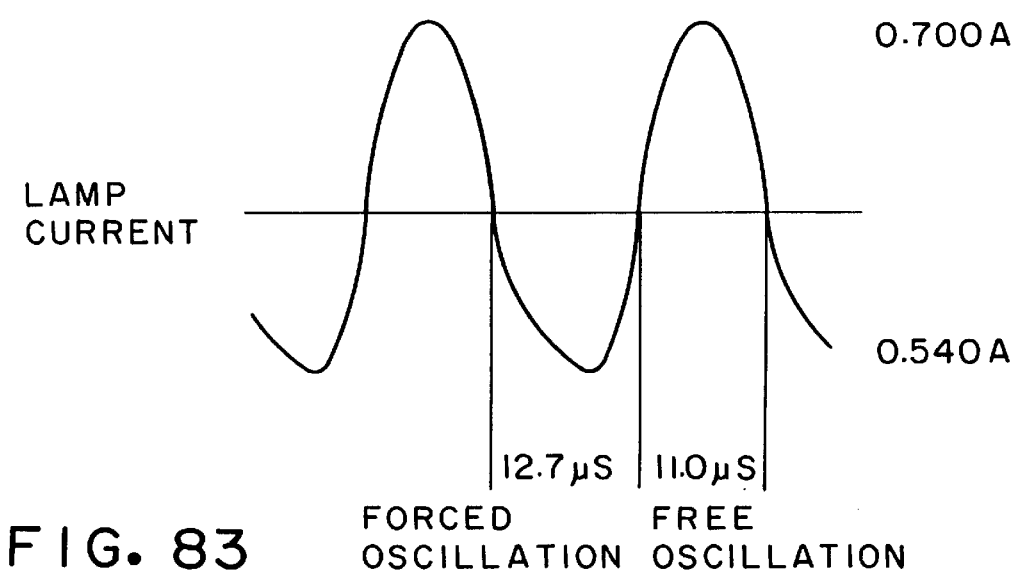
FIG. 83 is a waveform illustration showing the crests shown in FIG. 80.

Furthermore, an explanation is given regarding lamp current of the discharge lamp lighting device shown in FIGS. 1 and 2, FIGS. 3 and 4, and the first comparative example. Referring to FIGS. 78 through 83, FIG. 78 is a waveform illustration shoving the full cycle waveforms of the current of lamp FL of the discharge lamp lighting device shown in FIG. 1 and 2; FIG. 81 is a waveform illustration showing the crest portions shown in FIG. 78. FIG. 79 is a waveform illustration showing the full cycle waveforms of the current of lamp FL of the discharge lamp lighting device shown in FIGS. 3 and 4; FIG. 82 is a waveform illustration showing the crest portions shown in FIG. 79. FIG. 80 is a waveform illustration showing the full cycle waveforms of the current of the lamp of the discharge lamp lighting device according to the first comparative example; and FIG. 83 is a waveform illustration showing the crest portions shown in FIG. 80. Specific numerical values are as shown in Table 3 below:

TABLE 3

|   | Lamp Crest Factor | Off Duty | Lamp Current |
|---|---|---|---|
| A | 1.63 | 48.4 | 0.364 |
| B | 1.66 | 48 | 0.369 |
| C | 1.85 | 46.4 | 0.378 | where:
A: the discharge lamp lighting device shown in FIGS. 1 and 2
B: the discharge lamp lighting device shown in FIGS. 3 and 4 and
C: the discharge lamp lighting device according to the first comparison example.

As is evident from the above results, both discharge lamp lighting devices shown in FIGS. 1 and 2 and FIGS. 3 and 4 present decrease of current at the crest portions and increase of current at the trough portions. As the crest factors of the lamp current are thus improved, flickers are restrained, while the stresses applied to the lamps are reduced. In addition, as the on-duty characteristics of transistor Q1 is improved by bringing the periods of forced oscillation and free oscillation closer together, the unbalance of the lamp current is eliminated so that cataphoresis and ground noise are reduced.

Furthermore, since the lamp current is nearly flat, the lamp power characteristic can be improved by making the effective lamp power equal to that of the comparative example.

The first auxiliary capacitor and the diode reduce high harmonic elements in the input current. During the forced oscillation when the switching means is in the "on" state, the first auxiliary capacitor is maintained in parallel with the group of components including the inductor, through which forced oscillation current flows in the parallel resonance circuit. This means that forced oscillation current flows continuously and stably regardless of phase-advancing impedance of the first auxiliary capacitor. During the free oscillation when the switching means is in the "off" state, the first auxiliary capacitor and the diode, which are in the parallel resonance circuit, strengthen the parallel resonance circuit regardless of the switching element because the parallel resonance circuit is provided independently of the switching element. Therefore, power efficiency is increased, while the circuit efficiency, too, is increased by rectification of current unbalance. In addition, the first auxiliary capacitor and the diode have the function of reducing voltage applied to the switching element and current conducted to the same.

During the forced oscillation, the parallel circuit composed of the first auxiliary capacitor and the diode function together with the second condenser and the diode, thereby reducing high harmonic elements in the input current.

As parallel resonance is also generated by the second auxiliary capacitor which is connected in parallel with the inductor, high harmonic elements in the input current can be reduced by changing the conditions.

Although the above descriptions relate to an output load that consists of a light, it is to be understood that any load could be used with the present power supply.

The term "diode" as used in the description refers to any type of p-n junction whether realized in a device labeled a diode or realized in any other fashion know by those skilled in the art. For example, a portion of a transistor could be used as a diode.

Although a BJT transistor is shown and described in the above embodiments, any switching device should be considered to be within the scope of the present invention. For example, a MOSFET, JFET, diode, or discrete circuitry could be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power supply circuit comprising:
    a rectifier;
    a primary capacitor parallel connected to said rectifier;
    inverting means coupled to said rectifier with partial smoothing means disposed therebetween;
    a series combination of a choke coil and a condenser;
    said partial smoothing means including said series combination;
    said series combination connected in parallel with said inverting means with a charge diode therebetween; and
    switching means coupled to said inverting means.

2. A power supply circuit as in claim 1, wherein:
    said rectifier is a full-wave rectifier.

3. A power supply circuit as in claim 1 wherein said partial smoothing means comprises:
    a first, second, and third diode forming a combination in parallel with said primary capacitor, where said third diode is disposed in a reversed polarity with respect to said first and second diodes;
    said series combination in parallel with said second diode;
    said first diode and said second diode meeting at a first node; and
    said charge diode coupled to said first node.

4. A power supply circuit as in claim 1 wherein said inverting means comprises:
    a first combination of a first auxiliary capacitor and a first inductor; and
    said first combination is disposed in parallel with a main capacitor.

5. A power supply circuit as in claim 1 further having an output magnetically coupled to said inverting means, said output comprising:
    a winding, a ballast, and a pair of filaments connected in series; and
    a starting capacitor disposed in parallel with said pair of filaments.

6. A power supply circuit as in claim 1 wherein said inverting means and said partial smoothing means in combination comprise:
    a first combination of a first auxiliary capacitor and a first winding;
    a main capacitor disposed in parallel with said first combination;
    a second combination including a first, second, and third diode;
    said third diode disposed in a reversed polarity with respect to said first and second diodes;
    a second capacitor disposed in parallel with said second combination; a fourth diode coupled between said second capacitor and said primary capacitor;
    said series combination disposed in parallel with said second diode and in parallel with said first winding;
    said first diode and said second diode meeting at a first node;
    said first winding and said main capacitor meeting at a second node; and
    said charge diode disposed between said first node and said second node.

7. A power supply circuit as in claim 1 wherein said inverting means comprises:
    a combination of a first capacitor and a winding;
    a second capacitor in parallel with said winding; and
    a main capacitor in parallel with said combination.

8. A power supply circuit as in claim 1 wherein:
    said inverting means includes a parallel combination of a winding and a first auxiliary capacitor;
    said inverting means also includes a second auxiliary capacitor disposed in series with said parallel combination; and
    a main capacitor is disposed in parallel with said inverting means.

9. A power supply circuit as in claim 8 where said main capacitor and said second auxiliary capacitor are coupled together.

10. A power supply circuit as in claim 1 wherein said inverting means comprises:
    a combination of a main capacitor and an auxiliary capacitor; and
    a winding disposed in parallel with said combination.

11. A power supply circuit as in claim 1 wherein:
    said inverting means includes a main capacitor in parallel with a winding;
    said partial smoothing means includes a first, second, and third diode connected together;
    said third diode in reverse polarity with respect to said first and second diodes;
    an auxiliary capacitor disposed in parallel with said third diode;
    said series combination in parallel with said second diode;
    said first and second diode meeting at a first node; and
    said charge diode coupled between said first node and said inverting means.

12. A power supply device as in claim 1 wherein said inverting means comprises a winding in parallel with a main capacitor.

13. A power supply device as in claim 1 wherein said partial smoothing means further comprises:
    a first and a second diode;
    said first and second diodes meeting at a node; and said charge diode and said series combination also meeting at said node.

14. A power supply device comprising:
    a rectifier parallel connected to a primary capacitor;
    a first combination of a first, second, and third diode series connected together with said first diode in reverse polarity with respect to said first and second diode;
    said first combination parallel connected to said rectifier;
    a second combination of a choke coil and a smoothing capacitor;
    said second combination in parallel with said second diode;
    a first auxiliary capacitor in parallel with said first diode;
    said second diode and said third diode meeting at a first node;
    a charge diode coupled to said first node and a second node;
    said first diode and said second diode meeting at a third node;
    a first winding disposed between said second node and said third node;

a switch coupled between said rectifier and said second node; and a main capacitor in parallel with a third combination of said first auxiliary capacitor and said first winding.

15. A power supply device as in claim 14 further comprising:

a lamp load having a second winding, a ballast, and a pair of filaments connected in series; and a starting capacitor in parallel with said pair of filaments.

16. A power supply device as in claim 14 further comprising:

a second capacitor disposed in parallel with said first combination; and a fourth diode; and said first combination is parallel connected to said rectifier through said fourth diode.

17. A power supply device as in claim 14 further comprising a second auxiliary capacitor disposed in parallel with said first winding.

18. A power supply device comprising:

a rectifier parallel connected to a primary capacitor;

a first combination of a first, second, and third diode series connected together with said third diode in reverse polarity with respect to said first and second diode;

said first combination coupled to said rectifier;

a second combination of a choke coil and a smoothing capacitor;

said second combination in parallel with said second diode;

a first auxiliary capacitor in parallel with said third diode;

said second diode and said first diode meeting at a first node;

a charge diode coupled to said first node and a second node;

said third diode and said second diode meeting at a third node;

a first winding disposed between said second node and said third node;

a switch coupled between said rectifier and said second node;

a main capacitor coupled in parallel with said switch; and a second auxiliary capacitor in parallel with said first winding.

19. A power supply device comprising:

a rectifier parallel connected to a primary capacitor;

a first combination of a first, second, and third diode series connected together with said third diode in reverse polarity with respect to said first and second diode;

said first combination parallel connected to said rectifier;

a second combination of a choke coil and a smoothing capacitor;

said second combination in parallel with said second diode;

said second diode and said first diode meeting at a first node;

a charge diode coupled to said first node and a second node;

said third diode and said second diode meeting at a third node;

a first auxiliary capacitor parallel connected across said first and second diodes;

a first winding disposed between said second node and said third node;

a switch coupled between said rectifier and said second node;

a main capacitor coupled in parallel with said switch; and a second auxiliary capacitor in parallel with said first winding.

20. A power supply device comprising:

a rectifier parallel connected to a primary capacitor;

a first combination of a first second and third diode series connected together with said first diode in reverse polarity with respect to said second and third diode;

said first combination parallel connected to said rectifier;

a first capacitor in parallel with said second and third diodes;

a second combination of a choke coil and a smoothing capacitor;

said second combination in parallel with said second diode;

said second diode and said third diode meeting at a first node;

a charge diode coupled to said first node and a second node;

said first and second diode meeting at a third node;

a first winding disposed between said second node and said third node;

a main capacitor disposed in parallel with said first winding; and a switch coupled between said rectifier and said second node.

21. A power supply device comprising:

a rectifier parallel connected to a primary capacitor;

a first combination of a first, second and third diode series connected together with said first diode in reverse polarity with respect to said second and third diode;

said first combination parallel connected to said rectifier;

a first capacitor in parallel with said first diode;

a second combination of a choke coil and a smoothing capacitor;

said second combination in parallel with said second diode;

said second diode and said third diode meeting at a first node;

a charge diode coupled to said first node and a second node;

said first and second diode meeting at a third node;

a first winding disposed between said second node and said third node;

a main capacitor disposed in parallel with said first winding; and a switch coupled between said rectifier and said second node.

22. A power supply device comprising:

a rectifier parallel connected to a primary capacitor;

a first combination of a first, second, and third diode series connected together with said third diode in reverse polarity with respect to said first and second diode;

said first combination coupled to said rectifier;

a second combination of a choke coil and a smoothing capacitor;

said second combination in parallel with said second diode;

a first auxiliary capacitor is parallel with said third diode;

said second diode and said first diode meeting at a first node;

a charge diode coupled to said first node and a second node;

said third diode and said second diode meeting at a third node;

a main capacitor disposed between said second node and said third node;

a switch coupled between said rectifier and said second node; and a winding in parallel with a third combination of said first auxiliary capacitor and said main capacitor.

23. A power supply device comprising:

a rectifier parallel connected to a primary capacitor;

a first combination of a first, second, and third diode series connected together with said third diode in reverse polarity with respect to said first and second diode;

said first combination parallel connected to said rectifier;

a second combination of a choke coil and a smoothing capacitor, said second combination in parallel with said second diode;

a first auxiliary capacitor is parallel with said third diode;

said second diode and said first diode meeting at a first node;

a charge diode coupled to said first node and a second node;

said third diode and said rectifier meeting at a third node;

a main capacitor disposed between said second node and said third node;

a switch coupled between said rectifier and said second node; and a winding in parallel with said main capacitor.

* * * * *